United States Patent [19]
Ichiriki

[11] Patent Number: 6,040,920
[45] Date of Patent: *Mar. 21, 2000

[54] DOCUMENT STORAGE APPARATUS

[75] Inventor: Hideki Ichiriki, Kanagawa, Japan

[73] Assignee: Fuji Xerox Co., Ltd., Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/802,567

[22] Filed: Feb. 19, 1997

[30] Foreign Application Priority Data

Feb. 20, 1996 [JP] Japan .................................. 8-032484
Feb. 20, 1996 [JP] Japan .................................. 8-032490

[51] Int. Cl.$^7$ ..................................................... H04N 1/00
[52] U.S. Cl. .......................................... 358/403; 382/305
[58] Field of Search .................................. 358/403, 458; 382/305

[56] References Cited

U.S. PATENT DOCUMENTS

| | | | |
|---|---|---|---|
| 5,200,830 | 4/1993 | Imaizumi et al. | 358/468 |
| 5,222,157 | 6/1993 | Yoneda et al. | 358/403 |
| 5,408,340 | 4/1995 | Edamura | 358/468 |
| 5,528,383 | 6/1996 | Tezuka et al. | 358/468 |
| 5,532,841 | 7/1996 | Nakajima et al. | 358/468 |
| 5,644,404 | 7/1997 | Hashimoto et al. | 358/403 |
| 5,666,210 | 9/1997 | Yanai et al. | 358/468 |

OTHER PUBLICATIONS

Ed Krol, "The Whole Internet User's Guide and Catalog," Second Edition, pp. 409–457.

*Primary Examiner*—Yon J. Couso
*Attorney, Agent, or Firm*—Finnegan, Henderson, Farabow, Garrett & Dunner, L.L.P.

[57] ABSTRACT

A document storage apparatus of a document reading system. The document storage apparatus has a document storage section which stores a document created by a document creating apparatus and having a plurality of pages by forming the document into an electronic document in which at least one set of image data is stored in page units. When a read demand has been issued from a document reading apparatus, a read demand receiving and analyzing section receives the read demand to analyze the required contents. The required electronic document is, in page units, acquired from the document storage section so as to be processed into a format meeting the required contents by a document processing section. Then, a response data generating section generates response data in which reference information with which page instruction is enabled when a next read demand is issued is embedded. The response data formed in page units is transmitted to a document reading apparatus by a document transmitting section.

8 Claims, 23 Drawing Sheets

FIG. 15

```
< HTML >

< HEAD >

< TITLE > A. MP page 3 < / TITLE >

< / HEAD >

< BODY >

< img src = " A. MP-p3. JPG" >

< A HREF = " A. MP-p2" > PREVIOUS PAGE < / A >

< A HREF = " A. MP-p4" > NEXT PAGE < / A >

< / BODY >

< / HTML >
```

DOCUMENT STORAGE APPARATUS

BACKGROUND OF THE INVENTION

1. Field of the Invention

The present invention relates to a document storage apparatus of a document reading system, and more particularly to a document storage apparatus of a document reading system for providing a stored electronic document for a user to meet a requirement to read the electronic document from a document reading apparatus.

2. Description of the Related Art

In recent years, a system for reading a simple document in a network environment has been used widely. For example, information reading environment called "Internet" and "Worldwide Web (WWW)", which have been talked about recently, can be available. The reading systems above employ a method of communicating the data format, called "Hyper Text Markup-Language (HTML)" by a protocol called "Hyper Text Transfer Protocol (HTTP)" between the "WWW server" and the "WWW browser".

The above-mentioned system has been used generally as a system in which data of character information and image information in predetermined format is interchanged in a simple format described in a markup language in card (one sheet having no concept of pages) units so as to be read. The technique about Internet is described in ISBN4-900718-12-2 "Internet User's Guide".

There arises a requirement to construct, on the infrastructure above, a system for communicating electronic documents which read the same in and out of the company of users.

However, when the above-mentioned network environment is used to construct the document reading system, a satisfactory system has not been realized. Because a document is formatted in accordance with a simple grammar based on the text, the types of documents which can be shown are limited. Since documents are created with a specific grammar, documents cannot be created as they are by a word processor, and thus a peculiar technique for creating documents is required. Moreover, a word processor having a function capable of converting a document into HTML format or outputting a document in HTML format must be used.

On the other hand, a document interchanging method is available in which a document is acquired by using a file transfer protocol to convert the document into a data file of a word processor document. This method is insufficient, however, to construct a satisfactory system. Because word processor data of all pages is required, the contents of the document cannot be read even if the leading end page is required to be read. If a document having many pages is read, it takes an excessively long time to transfer the document. Furthermore, the user must have application software, such as word processor software, to read various word processor data. Therefore, all of the users who require the document cannot have all of application software required to read the document.

Although a method may be employed in which the server side converts the document into a document format required by the user and transmits the converted document, perfect compatibility in converting word processor data cannot be realized and therefore conversion is limited. Thus, the converted document inevitably different than the original document. Moreover, a multiple word processor data formats and frequent limit the utility of the foregoing method of document format conversion. For example, only formats of representative application software can be converted.

On the other hand, an image filing apparatus can be available as a local apparatus for interchanging a document through a network. A variety of contrivances have been performed to display a raster image in the image filing apparatus. However, the contrivance for the image filing system for scan images, which are formed in a data format in page units, cannot be applied to document data of general application software consisting of a plurality of pages and having no format compatibility. Furthermore, another contrivance is required to construct a remote reading apparatus arranged to be operated through a network individually from the contrivance for the image filing system established on the basis of local filing.

Moreover, when read data is required to be printed, a multi-page document cannot be printed with a high quality, such that various graphics and spreadsheets are used as desired and a satisfactory shape is realized, if the read document involves a limitation in power of expression. If a document having a high quality is required, a word processor document, which takes a long time to read, must be used.

SUMMARY OF THE INVENTION

In view of the foregoing, an object of the present invention is to provide a document storage apparatus for a document reading system. A reading system having no concept of pages is permitted to read an arbitrary document created by general application software while being conscious of pages. An object of the present invention is to reduce the quantity of information required to be transferred at one reading demand when a document is read by a remote reading apparatus through a communication line or in a local system so that the response performance is improved.

Another object of the present invention is to provide a document storage apparatus of a remote printing system which is capable of improving the response performed by reducing the quantity of information required to be transferred after a read demand has been issued from a user. When a user requires a document to be read and printed, the present invention creates a document which does not require specific software and which enables the read page to be remote-printed with a high quality.

According to the present invention, there is provided a document storage apparatus for forming a document reading system such that the document storage apparatus is combined with a document reading apparatus comprising read demand transmitting means for transmitting a read demand and document receiving means for receiving a document transmitted in response to the read demand to display the received document and to create a read demand in accordance with reference information of the displayed document in a case where the reference information has been instructed, the document storage apparatus comprising: read demand receiving and analyzing means for receiving the read demand issued from the document reading apparatus to analyze required contents; document storage means for storing an electronic document held in page units; document extracting means for extracting a subject page of the electronic document to meet the read demand; response data generating means for generating reference information to a front page and a rear page to meet the read demand to synthesize the reference information to the page of the electronic document extracted by the document extracting means so as to generate response data; and document transmitting means for transmitting the generated response data to the document reading apparatus from which the read demand has been issued.

Also, there is provided a document storage apparatus for forming a remote printing system such that the document storage apparatus is combined with a printing apparatus for printing print data and a document reading apparatus comprising read demand transmitting means for transmitting a read demand including display of a print image and instruction of a printing condition and document receiving means for receiving read response data transmitted in response to the read demand to display the received read response data and to create a read demand in accordance with reference information of the displayed read response data in a case where the reference information has been instructed so as to transmit the read demand, the document storage apparatus comprising: read demand receiving and analyzing means for receiving the read demand issued from the document reading apparatus to analyze required contents; document storage means for storing an electronic document including read data held in page units and print data held in page units; document extracting means for extracting a subject page of the read data and print data to meet the read demand; read response data generating means for generating reference information to a front page and a rear page to meet the read demand to synthesize the reference information to the page of the read data extracted by the document extracting means so as to generate read response data; and document transmitting means for transmitting the generated read response data to the document reading apparatus from which the read demand has been issued and for transmitting the print data to the printing apparatus.

BRIEF DESCRIPTION OF THE DRAWINGS

FIG. 15 is a diagram showing an example for creating a response data format;

DETAILED DESCRIPTION OF THE PREFERRED EMBODIMENTS

A first embodiment of the present invention will now be described with reference to the drawings.

Figure 1:
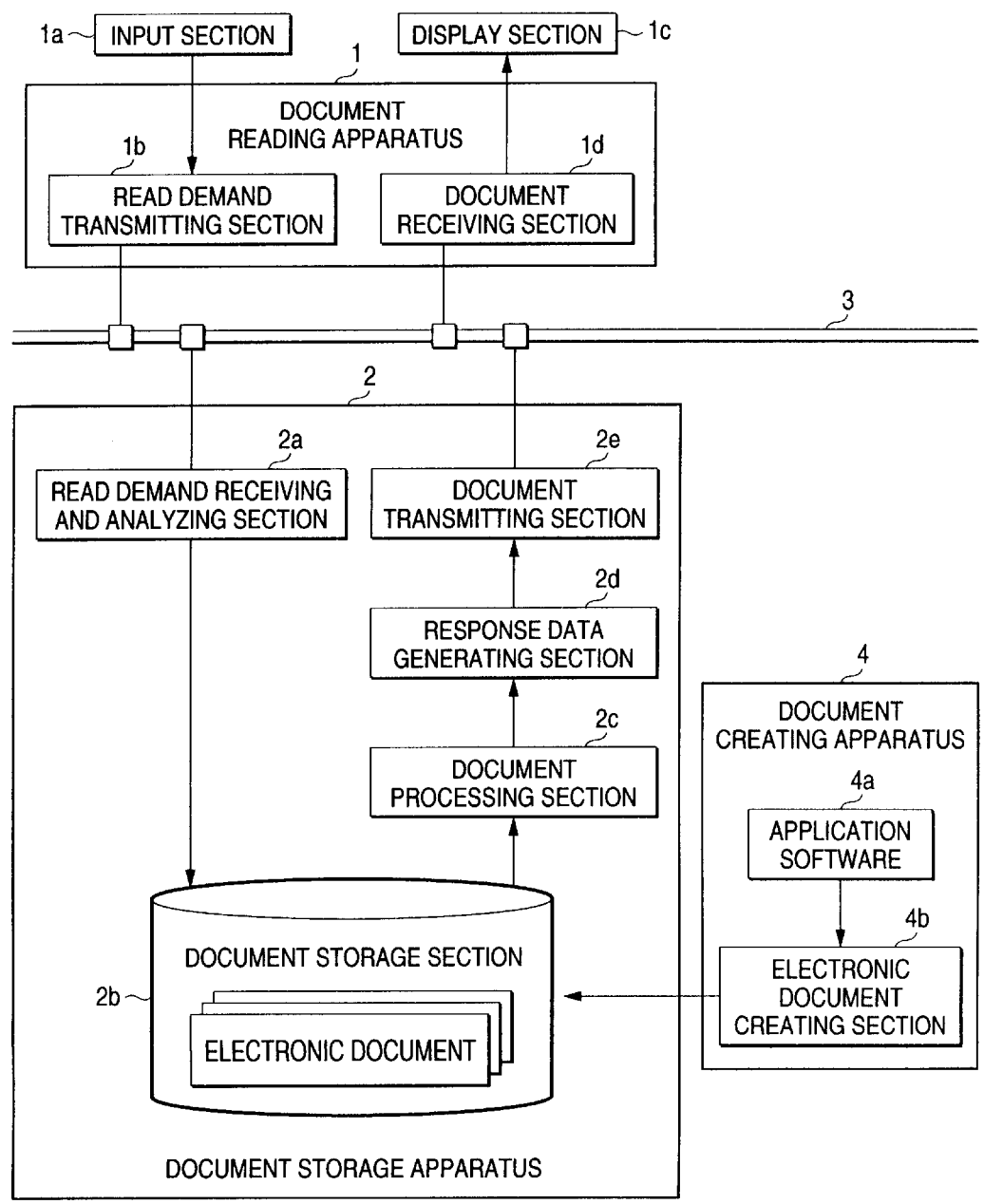
FIG. 1 is a diagram showing the principle and structure of a document reading system in a first embodiment of the present invention.

FIG. 1 is a diagram showing the principle and structure of a document reading system.

Referring to FIG. 1, the document reading system has a document reading apparatus 1, a document storage apparatus 2 and a communication passage 3 for connecting the document reading apparatus 1 and the document storage apparatus 2 to each other. Moreover, the document reading system has a document creating apparatus 4 for creating an electronic document to be read.

The document reading apparatus 1 has a read demand transmitting section 1b for transmitting a read demand input and instructed through an input section 1a to the document storage apparatus 2, and a document receiving section 1d for receiving response data transmitted from the document storage apparatus 2 in response to the read demand and for outputting the response data above to a display section 1c. The document storage apparatus 2 has a read demand receiving and analyzing section 2a for receiving the read demand transmitted from the document reading apparatus 1 through the communication passage 3 to analyze the contents of the read demand, a document storage section 2b for storing electronic documents each of which has been created by the document creating apparatus 4 and in each of which at least one group of image data is stored in page units, a document processing section 2c for, in page units, processing data of the electronic document stored in the document storage section 2b and required by the document reading apparatus 1 to meet the instructed requirement, a response data generating section 2d for providing reference information for instructing an adjacent page to the document processed by the document processing section 2c to generate response data, and a document transmitting section 2e for transmitting the response data generated by the response data generating section 2d to the document reading apparatus 1 from which the read demand has been issued. The document creating apparatus 4 includes application software 4a, such as a word processor, having a function for printing data on a paper medium, and an electronic document creating section 4b for receiving a print control command issued from the application software 4a when the printing operation is performed to process data into image data in a predetermined image format in page units so as to collect image data in page units so as to output the same to the document storage apparatus 2, the electronic document creating section 4b having a pseudo printing mechanism.

With the above-mentioned document reading system, an electronic document is, in the document creating apparatus 4, created by the application software 4a. The application software 4a is any one of word processor software, spreadsheet software, drawing software and database software. Strictly, the application software 4a is software having a function of printing data on a paper sheet. The document created by the application software 4a and having a plurality of pages is a transferred to the electronic document creating section 4b so as to be processed into an electronic document in which at least one image data group is stored in page units. The processed electronic document is transferred to the document storage apparatus 2 so that the document is stored in the document storage section 2b.

When the stored electronic document is read, a read demand supplied through the input section 1a is transmitted to the communication passage 3 by the read demand transmitting section 1b of the document reading apparatus 1. The transmitted read demand is received by the read demand receiving and analyzing section 2a of the document storage apparatus 2 so that the contents of the demand are analyzed. Then, the electronic document required to be read is acquired from the document storage section 2b, and then processed into a format corresponding to the contents of the read demand by the document processing section 2c. For example, instructed pages are extracted, instructed regions are extracted, conversion to an instructed resolution is performed and conversion to an instructed image formation is performed. Then, response data is generated by the response data generating section 2d. At this time, the response data generating section 2d generates response data formed by previously embedding reference information in a format for a document to be read in order to permit the document reading apparatus 1 to instruct the electronic document and pages when the document reading apparatus 1 issues the read demand through the read demand transmitting section 1b. The thus-generated response data is transmitted by the document transmitting section 2e. The response data transmitted through the communication passage 3 is received by the document receiving section 1d of the document reading apparatus 1 so as to be transmitted to the display section 1c so that response data is displayed.

Therefore, according to the present invention, response data corresponding to the read demand from the document reading apparatus 1 is image information in page units. Therefore, the quantity of data to be transmitted/received through the communication passage 3 corresponding to one read demand can be reduced to less than one page. Therefore, less time is taken to display the required pages on the display section 1c of the document reading apparatus 1 from the page display demand operation. Thus, the response efficiency in the reading operation in the document reading system can be improved.

Since an electronic document created by the specific application software 4a and having a plurality of pages is formed into general-purpose reading image data divided in page units by the electronic document creating section 4b and then stored in the document storage section 2b of the document storage apparatus 2, no specific application software for displaying the electronic document is required for the document reading apparatus 1.

A structure will now be described, in which the embodiment of the present invention is applied to a system permitting a plurality of users to read a document stored in the server of the network and having a plurality of pages.

Figure 2:
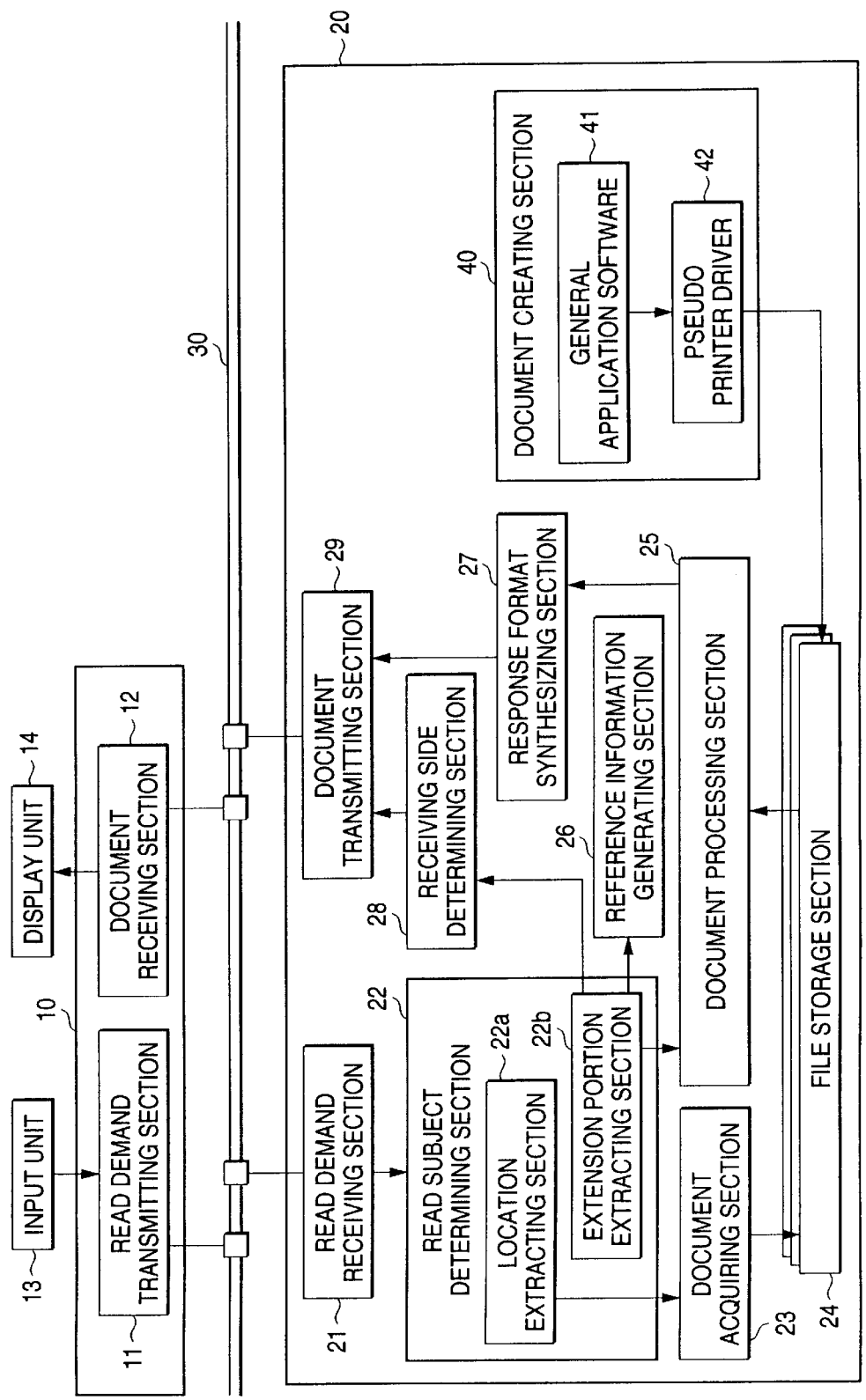
FIG. 2 is a block diagram showing an example of the structure of a server client system.

FIG. 2 is a block diagram showing an example of a server client system.

The server client system shown in FIG. 2 has a client 10, which is a terminal of a user, a file server 20, and a network 30 for connecting the client 10 and the file server 20 to each other, the network 30 being called Local Area Network (LAN) or Wide Area Network (WAN). The client 10 serves as the document reading apparatus and only one apparatus is illustrated though a plurality of clients 10 exist on the network.

The client 10 has a read demand transmitting section 11 and a document receiving section 12. An input unit 13, comprising a pointing device, such as a keyboard or a mouse, is connected to the read demand transmitting section 11. A display unit 14 is connected to the document receiving section 12. The read demand transmitting section 11 and the document receiving section 12 are connected to the network 30. The file server 20 has a read demand receiving section 21 connected to the network 30, a read subject determining section 22 for analyzing the received read demand, a document acquiring section 23 for acquiring the determined subject to be read, a file storage section 24 for storing electronic documents which have been created, a document processing section 25 for converting the acquired document into an instructed format analyzed by the read subject determining section 22, a reference information generating section 26 for generating information of adjacent pages on the basis of page information analyzed by the read subject determining section 22, a response format synthesizing section 27 for creating response data in the form in which reference information generated by the reference information generating section 26 is embedded in the document data processed by the document processing section 25, a receiving-side determining section 28 for determining the destination to which the response data is transmitted in accordance with information of the terminal from which the demand has been issued and which has been determined by the read subject determining section 22, and a document transmitting section 29 for transmitting the response data to the determined terminal. The read subject determining section 22 has a location extracting section 22a for extracting, from the read demand, information of the location of a subject file, and an extension portion extracting section 22b for extracting, from the read demand, an extension portion indicating the required contents of the process. The file server 20 also has a document creating section 40 consisting of general application software 41 and a pseudo printer driver 42. Although the structure, in which the document creating section 40 is mounted on the file server 20, has been described, the document creating section 40 may be provided for an arbitrary client on the network 30 if the environment permits the general application software 41 to be operated.

Specifically, the client 10 is, for example, a personal computer or a work station having document reading software (WWW browser) which is able to access the WWW server of Internet. When a user starts the software in the client 10 to transmit location identification name called Uniform Resource Locator (URL) in an instructed protocol called Hyper Text Transfer Protocol (HTTP) or File Transfer Protocol (FTP) to the file server 20, which is the WWW server, data to be returned as a response is displayed. Then, the user operates reference information to again transmit the location identification name to the file server. The above-mentioned operation is repeated so that information in a multiplicity of file servers connected to Internet is read and acquired.

The reference information is contained in a portion of display data which is received by the client 10, the reference information having information of the character range or region instruction and information required to issue a next read demand. When the specific display region has been instructed through the input unit 13, a read demand is issued in accordance with information above. The reference information is "anchor tag containing URL" in terms of the HTML grammar of WWW.

The read demand is a communication protocol which can be interpreted by the read demand transmitting section 11 and the read demand receiving section 21. The contents to be interchanged are called URL in the case of WWW, for example. In this case, for example, a character string is interchanged, which is "http://www.fx.co.jp/dir1/dir2/index.htm" formed by combining the type of the protocol, instruction of name of the WWW server (the network address) and instruction of the location of the file required to be read.

The file server 20 is a document storage apparatus which is a mechanism called WWW server in Internet and serves as a resident program on an operating system, such as Unix (trade name licensed by X/Open Co., Ltd. and registered in U.S. and other countries), Windows, WindowsNT (registered trade name of Microsoft, U.S.), having a directory type file system and a network communication function. When an access demand has been supplied from the client 10, an instructed file among HTML data file stored in a predetermined directory in the file storage section 24 is returned to the client 10 from which the demand has been issued.

The general application software 41 in the document creating section 40 in the file server 20 is generic name of marketing application software, the general application software 41 being any one of various application software, such as a word processor, an editor, a spreadsheet, a data base, and drawing software having a printing function via Graphic Device Interface (GDI).

The pseudo printer driver 42 is an apparatus which receives a print control command issued by the general application software 41 when the printing operation is performed, creates one or more types of image data by collecting the commands in page units, collects image data above to construct a page record and collects pages to output the same in a specific format. That is, the pseudo printer driver 42 receives, through a driver interface, the GDI command (a drawing function) issued from the general application software 41 for performing the printing process, converts information above into Page Description Language (PDL) or general image format and then forms the same into a file to store the same in the file storage section 24 as an electronic document in place of the operation of a general printer driver for transmitting the same to the printer.

Figure 3:
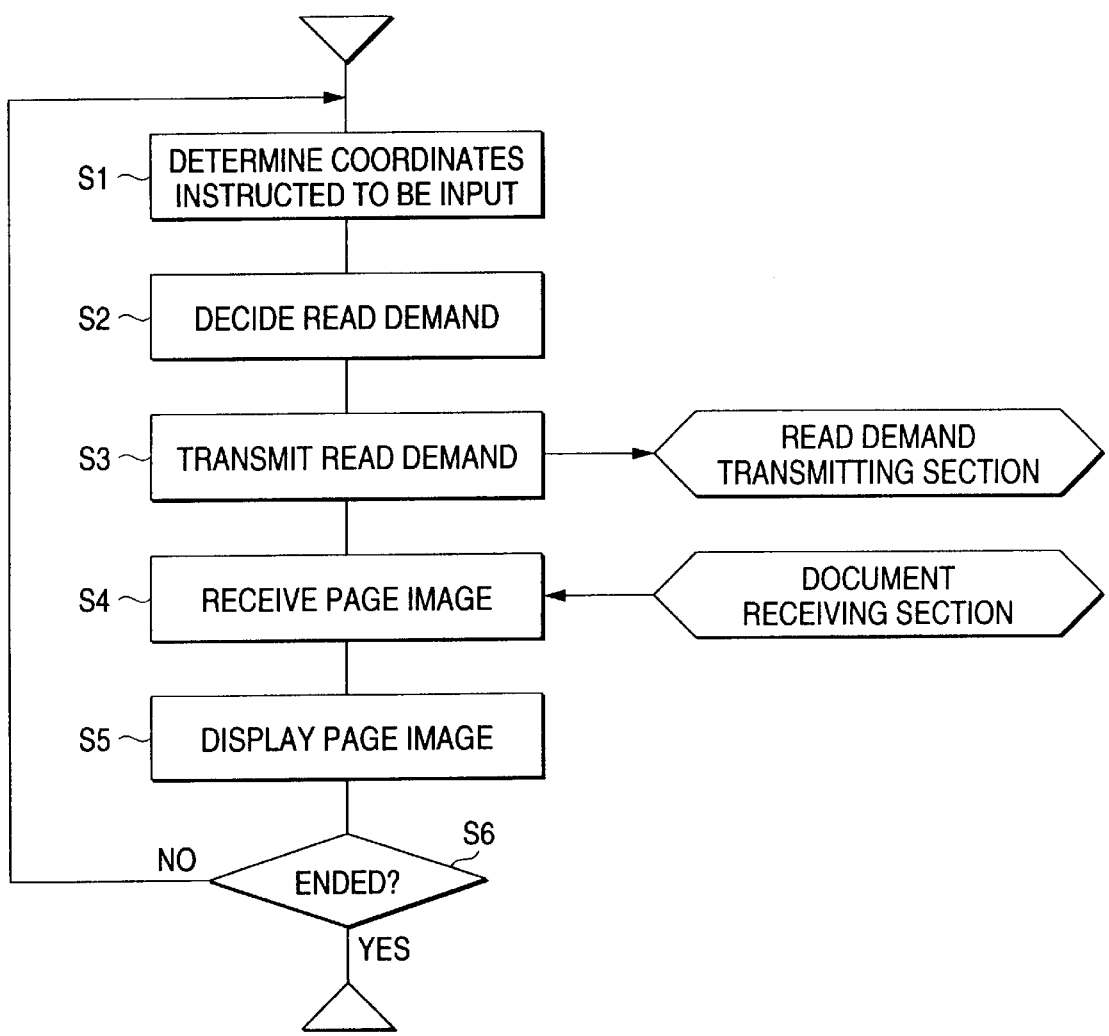
FIG. 3 is a flow chart of the operation of a document reading function of a client.

FIG. 3 is a flow chart showing the operation of the document reading function of the client.

When a document is read with the client 10, coordinates instructed through the input unit 13 are determined (step S1). Then, a read demand is decided on the basis of the instructed coordinates (step S2). Then, a process for transmitting the decided read demand is performed (step S3). During the process above, the read demand is transferred to the read demand transmitting section 11.

When the document receiving section 12 has received a reply to the read demand, the document receiving section 12 performs the page image receiving process (step S4). The received page image is transferred to the display unit 14 so as to be displayed by the display unit 14 (step S5). Finally, it is determined whether or not the document reading operation has been ended (step S6). If the operation is not ended, the operation returns to step S1. If the operation has been ended, the process is ended.

The read demand transmitting process in step S3 and the page image receiving process in step S4 will be described in detail respectively.

Figure 4:
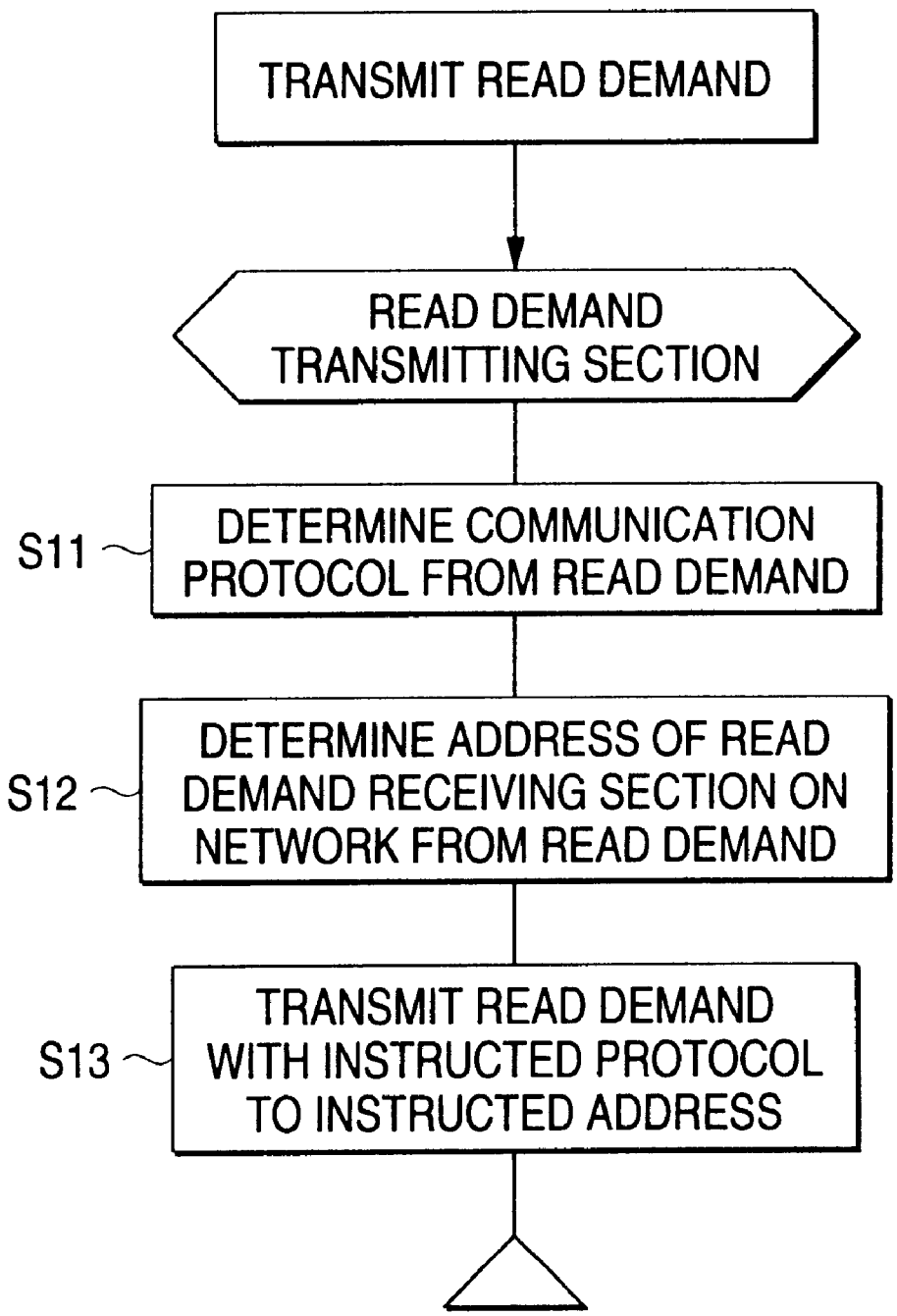
FIG. 4 is a flow chart of a read demand transmitting process.

FIG. 4 is a flow chart of the read demand transmitting process.

The read demand transmitting section 11 determines the communication protocol in accordance with the determined read demand (step S11). If the read demand (URL) is "http://www.fx.co.jp/A.mp?p1", the communication protocol is determined to be "http". Then, the network address of the read demand receiving section 21 is determined in accordance with the read demand (step S12). In this case, a network address, such as "129.249.xxx.yyy" is determined from the connected apparatus "www.fx.co.jp" described in the read demand. Then, the read demand is transmitted with the instructed protocol to the instructed address (step S13).

Figure 5:
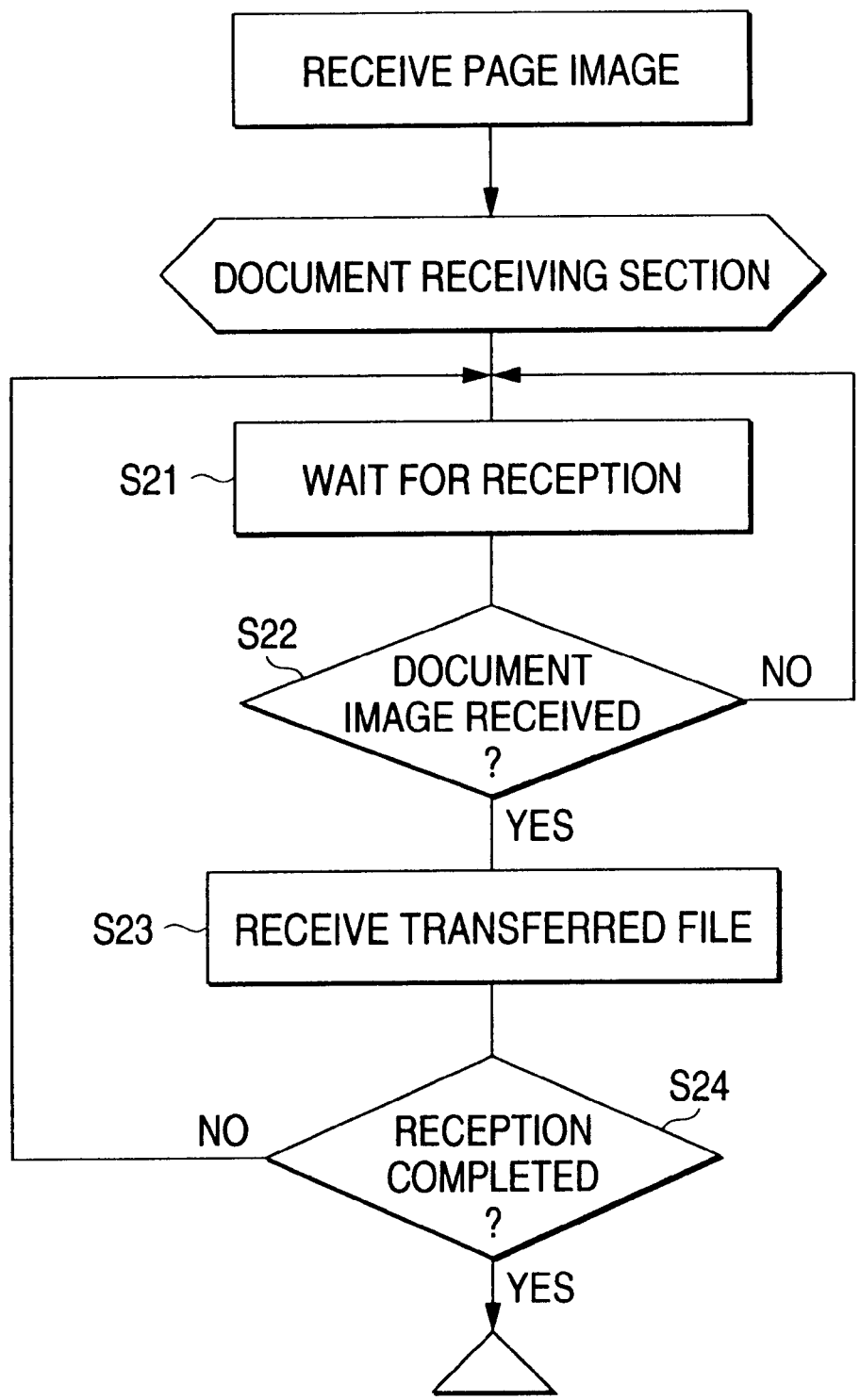
FIG. 5 is a flow chart of a page image receiving process.

FIG. 5 is a flow chart of the page image receiving process.

The document receiving section 12 is brought to a state for waiting for receiving a document image (step S21). Then, it is determined whether or not a document image has been received (step S22). If the document image has not been received, the operation returns to the state for waiting for receiving a document image. If the document image has been received, the file transferred from the document transmitting section 29 is received (step S23). Then, it is determined whether or not the receiving operation has been completed (step S24). If the receiving operation is not completed, the operation returns to the state for waiting for receiving a document image. If the receiving operation has been completed, the page image receiving process is ended.

The operation of the file server 20 will now be described.

Figure 6:
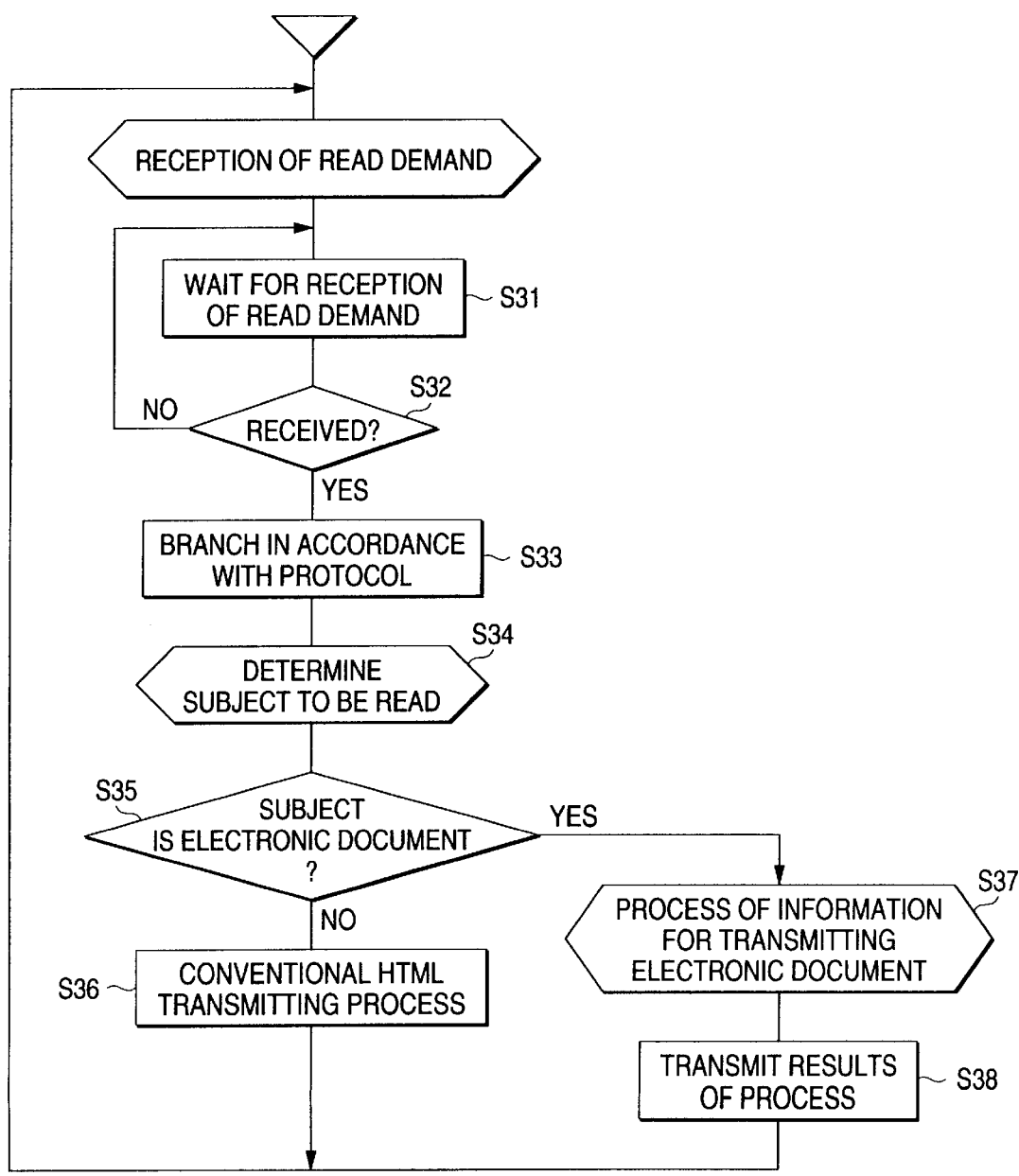
FIG. 6 is a flow chart of the operation of a file server.

FIG. 6 is a flow chart of the operation of the file server.

In the file server 20, a read demand receiving process is performed in the read demand receiving section 21. That is, the read demand receiving section 21 is brought to a state for waiting for a read demand (step S31). Then, it is determined whether or not the read demand has been received (step S32). If the read demand is not received, the operation returns to the reception waiting state.

If the read demand is received, the process is branched in accordance with the type of the protocol (step S33). Then, the operation proceeds to a process of determining the read subject in the read subject determining section 22 (step S34). After the determining process has been ended, it is determined whether or not the read subject file is an electronic document file in the format of the document creating section 40 (step S35). If the read subject is not an electronic document file of the document creating section 40, a conventional HTML transmitting process is performed (step S36). If the read subject is an electronic document file of the document creating section 40, a process for processing information for transmitting the electronic document is performed (step S37) so that a process for transmitting results of the process is performed (step S38). After the transmitting process in step S36 or S38 has been completed, the operation returns to the read demand receiving process.

The process for determining read subject in step S34 and the electronic document transmitting information process in step S37 will be described in detail.

Figure 7:
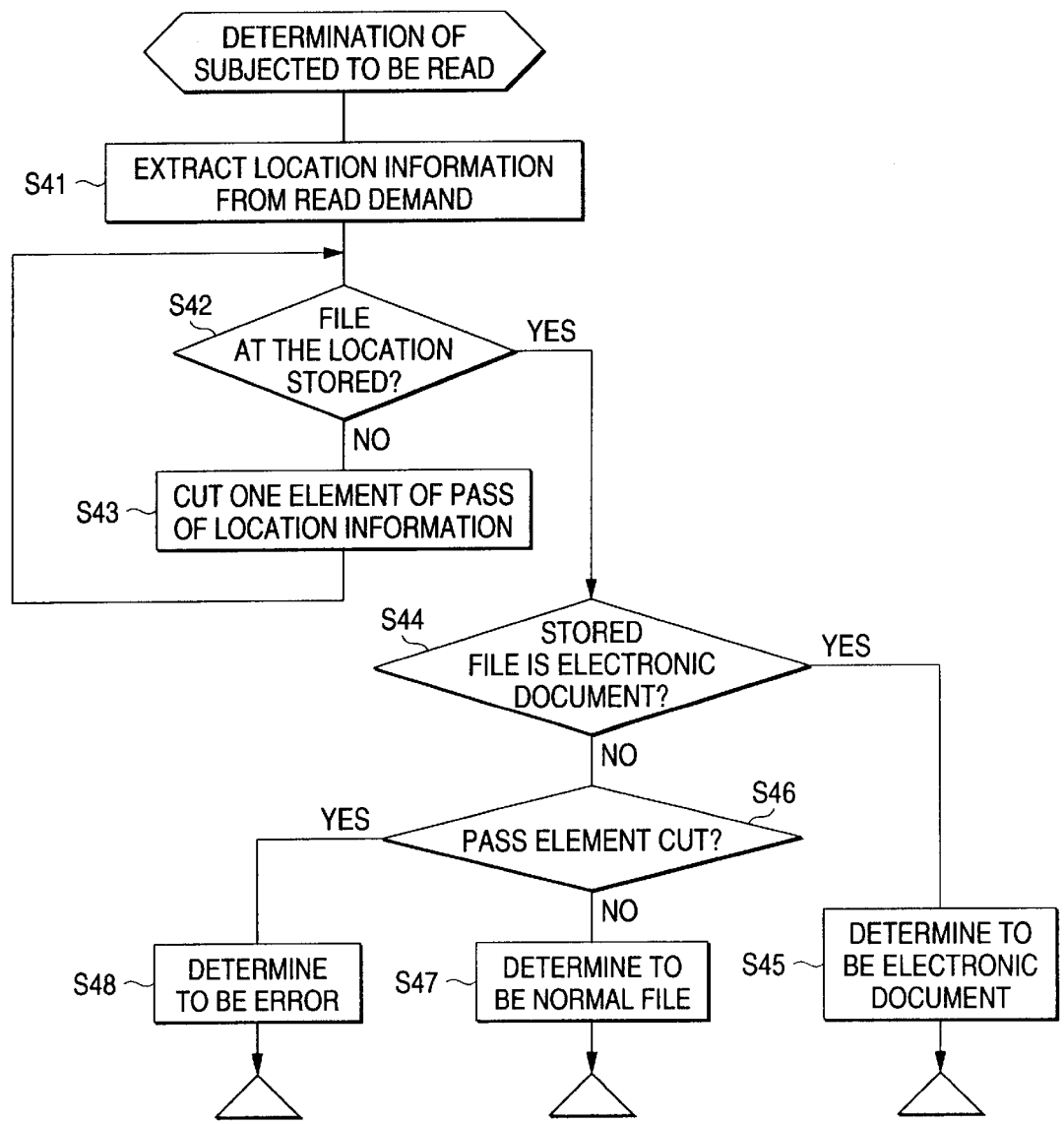
FIG. 7 is a flow chart of a process for determining a subject to be read.

FIG. 7 is a flow chart of the process for determining the subject to be read.

The electronic document transmitting information process, which is performed in the read subject determining section 22, is performed such that initially information of the location of the read subject is extracted from the read demand by the location extracting section 22a (step S41). If the read demand is, for example, "http://www.fx.co.jp/A.mp?p1", "A.mp?p1" following the description indicating the receiving side is extracted as the location information. Then, it is determined whether or not the file is stored at the location (step S42). If the file is not stored at the location, one element of the pass of the location information is cut (step S43). That is, the extension portion "?p1" is cut from the location information "A.mp?p1" to obtain "A.mp". If the file "A.mp" is stored at the location, it is determined whether or not the stored file is an electronic document in the format of the document creating section 40 (step S44). If the stored file is an electronic document in the format of the document creating section 40, a determination is made that the stored file is an electronic document (step S45). If a determination is made in step S44 that the stored file is not an electronic document, it is determined whether or not the pass element has been cut in step S43 (step S46). If the pass element has not been cut, a determination is made that the file is a normal file (step S47). If the pass element has been cut, a determination is made that an error has taken place (step S48).

Figure 8:
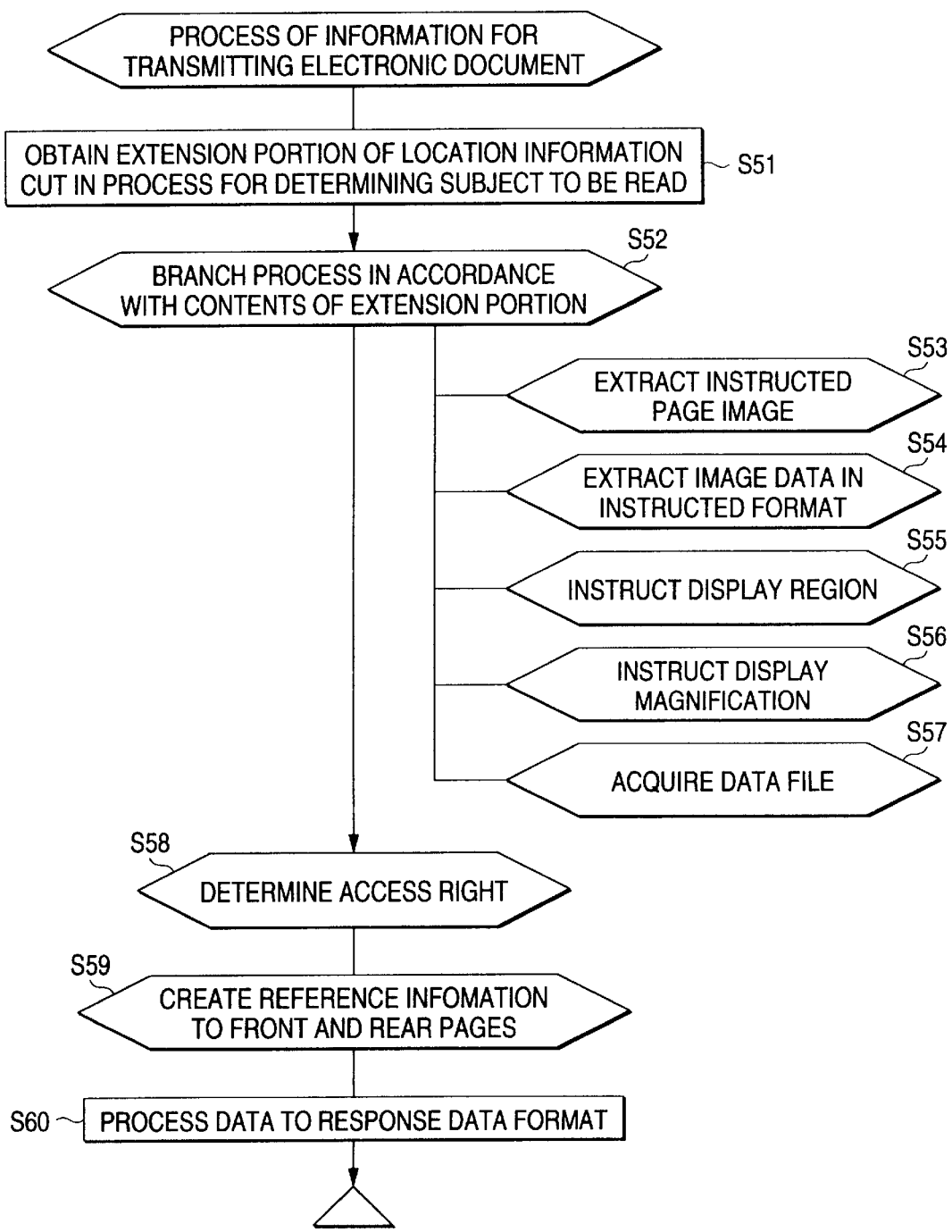
FIG. 8 is a flow chart of the operation for processing electronic document transmitting information.

FIG. 8 is a flow chart showing the electronic document transmitting information process.

In the document processing section 25, the extension portion of location information cut in the process for determining the read subject is acquired from the extension portion extracting section 22b (step S51). That is, if the location information is "A.mp?p1", then "p1" which is the extension portion is obtained. Then, the process is branched in accordance with the contents of the extension portion (step S52). That is, if the extension portion is "p1" as in the foregoing case, then the portion is an extension portion indicating page instruction. Therefore, the operation proceeds to a process for extracting an instructed page image (step S53). The process is further branched in the above-mentioned case into a process for extracting instructed format image data (step S54), a process for instructing a display region (step S55), a process for instructing a display magnification (step S56), a data file acquiring process (step S57), and an access right determining process (step S58). Then, a process for generating reference information to the front and rear pages is performed in the reference information generating section 26 (step S59). Finally, an operation for processing data into a data format for response is performed (step S60).

The processes in steps S54 to S59 will now be described in detail. Prior to describing the processes, the electronic document created by the document creating section 40 stored in the file storage section 24 will now be described.

Figure 9:
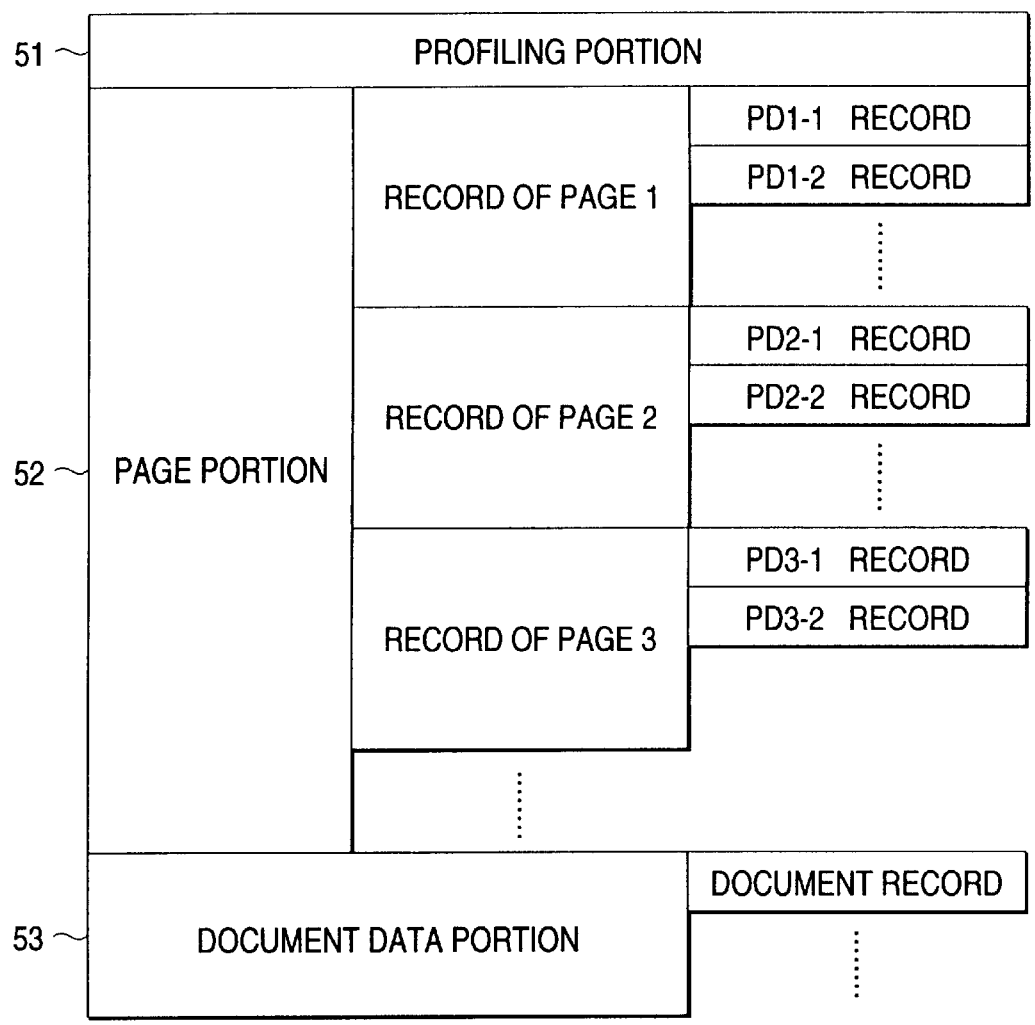
FIG. 9 is a diagram showing a data format of an electronic document which is output from a document creating apparatus.

FIG. 9 is a diagram showing the data format of an electronic document which is output from the document creating apparatus.

Referring to FIG. 9, the electronic document has a profiling portion 51, a page portion 52, and a document data portion 53. The profiling portion 51 contains attributes common to all pages, for example, index information, access information, and attribute of the number of pages. The page portion 52 is composed of records in page units. Moreover, the page portion 52 is able to store image data PD in a plurality of image formats. Note that PD1-x, PD2-x, PD3-x (where x is any one of 1, 2, 3, . . . ) indicate image data records of each page. Symbol z included in PDy-z (where y is the number of pages and z is any one of 1, 2, 3, . . . ) indicates the type of the image format. Specifically, the raster image includes paint type software images, G3 facsimile interchange images which are so-called Modified Modified Read (MMR) compressed images and scan images formed by an image scanner or a digital copying machine. As the paint type software image, the bit map format which is a standard format in HTML and a multiplicity of formats, which can be operated in the Windows environment, can be available. Vector images (a set of a character code, a graphic element, an image and drawing attribute) include Windows Meta File (WMF) and Enhanced WMF (EWMF) each of which is a standard graphic image interchange format in the Windows environment, PICT which is a standard graphic interchange format for use mainly in Macintosh (trade name of Apple Computer Inc., U.S.), Computer Graphic Metafile (CGM) which is ISO standard for interchanging graphic images, PDF which is a format for viewer "Acrobat" proposed by Adobe Systems, U.S., and Encapsulated PostScript Format (EPSF). Moreover, description languages for printers include PostScript (trade name of Adobe Systems, U.S.) which is a PDL. Among the above-mentioned images, a plurality of images can be selected and stored. The document data portion 53 stores data files in the format instructed by the application software with which the electronic document has been created, the data file being stored as a document record.

Figure 10:
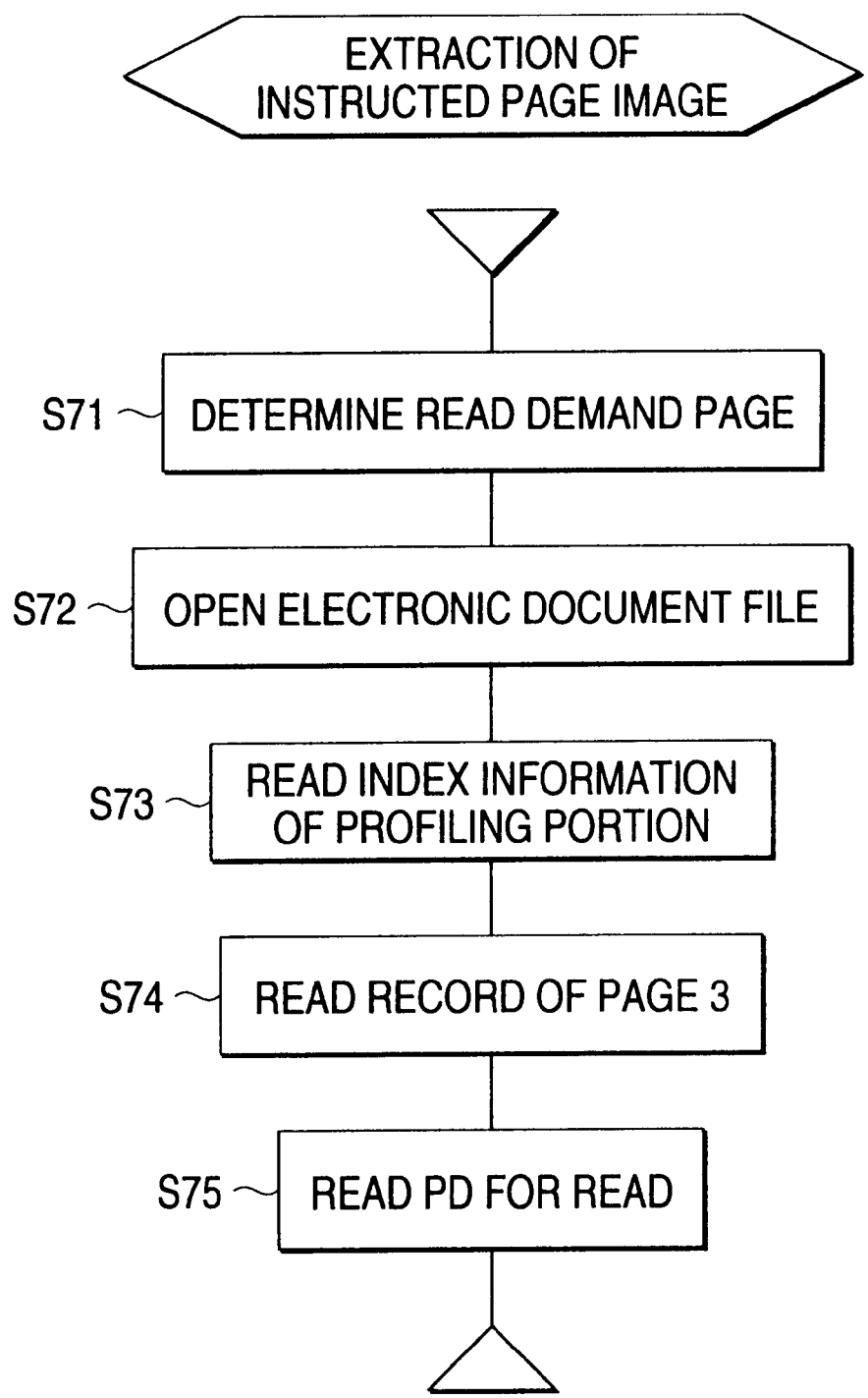
FIG. 10 is a flow chart of an instructed page extracting process.

FIG. 10 is a flow chart of the process for extracting the instructed page image. The process for extracting the instructed page image is performed such that pages demanded to be read are determined from the extension portion extracted by the extension portion extracting section 22b (step S71). If the read demand is "A.mp?p3" for example, a determination is made that the required page is the third page because the extension portion is "?p3". Then, the electronic document file "A.mp" which is required to be read is opened (step S72) to read index information of the profiling portion of the electronic document file (step S73). In accordance with index information above, the record of the third page in the page portion of the electronic document file is read (step S74) so that image data PD, which is the subject to be read, is read (step S75).

Figure 11:
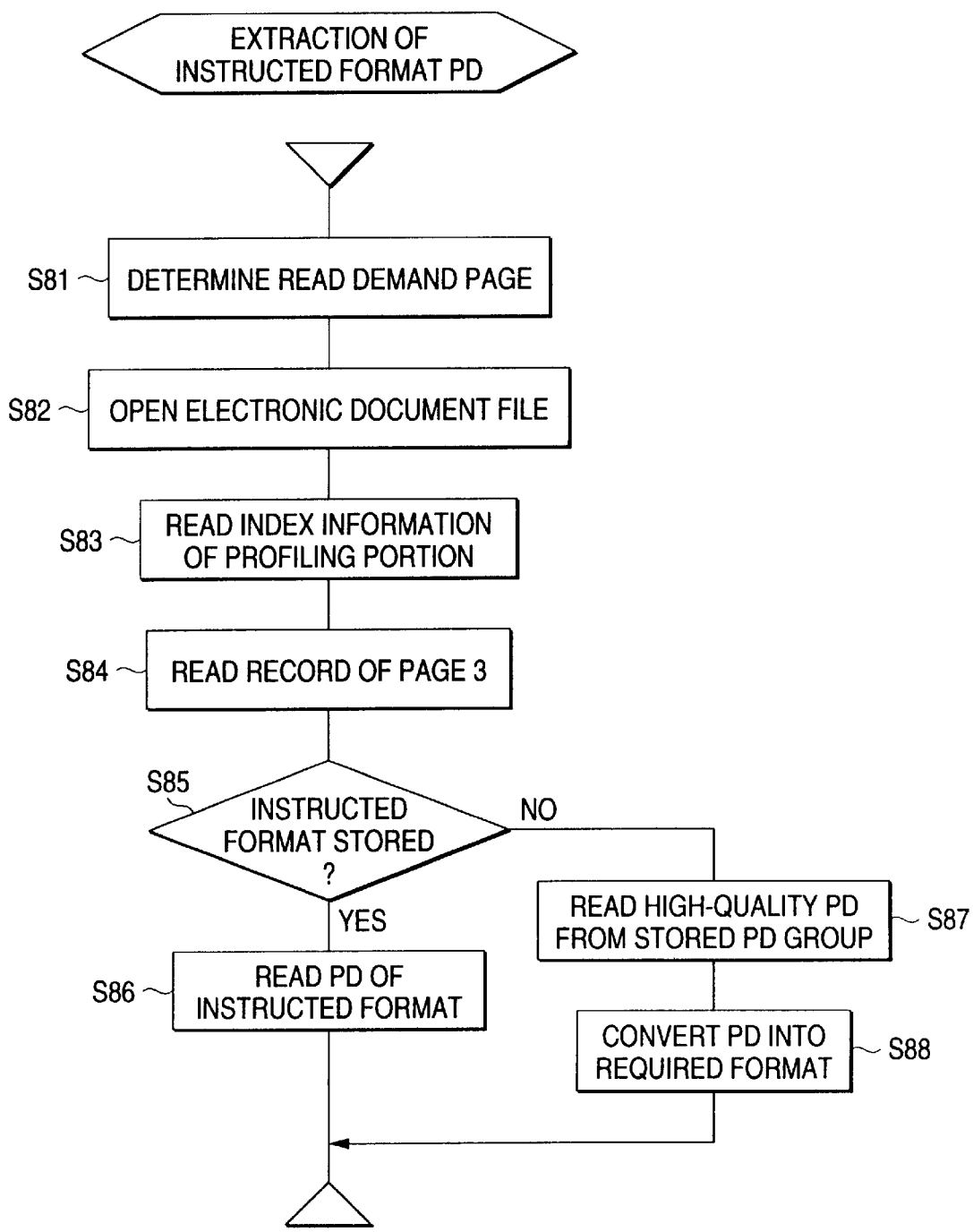
FIG. 11 is a flow chart of a process for extracting image data in an instructed format.

FIG. 11 is a flow chart of the process for extracting image data in an instructed format.

The process for extracting image data in an instructed format is performed such that the page demanded to be read is determined in accordance with the extension portion extracted by the extension portion extracting section 22b (step S81). If the read demand is "A.mp/p3?wmf" for example, a determination is made that the demanded page to be read is the third page and the instructed format is "wmf". Then, "A.mp" which is the electronic document file demanded to be read is opened (step S82) so that index information of the profiling portion of the electronic document file is read (step S83). In accordance with index information above, the record of the third page is read from the page portion of the electronic document file (step S84). Then, it is determined whether or not image data in the instructed format has been stored (step S85). If image data in the instructed format has been stored, image data PD in the instructed format is read (step S86). If image data in the instructed format is not stored, image data PD having a high quality is read from a group of image data PD stored in the record of the third page (step S87). Then, the read image data PD having a high quality is converted into image data PD in the instructed format (step S88).

As described above, instruction of the type of image data PD permits image data PD in the instructed format to be transferred when the same page image has been demanded to be read. Therefore, image data PD can be transmitted in the image format which can be received and displayed by general reading software. Thus, the document can be read by many users. Since the type of data to be interchanged can be selected by the client from, for example, a standard image, an image compressed at a high rate and an image having a high quality, a transference method adaptable to the condition can be selected such that monochrome binary compressed images are usually read and a color image is required, if necessary. As an alternative to this, if a large quantity of data can be transferred because the network is not busy or the network is located nearby, an image having a high quality is required. If the transmission ratio is unsatisfactorily low due to busy network or the like, an image having a small data quantity is required.

Figure 12:
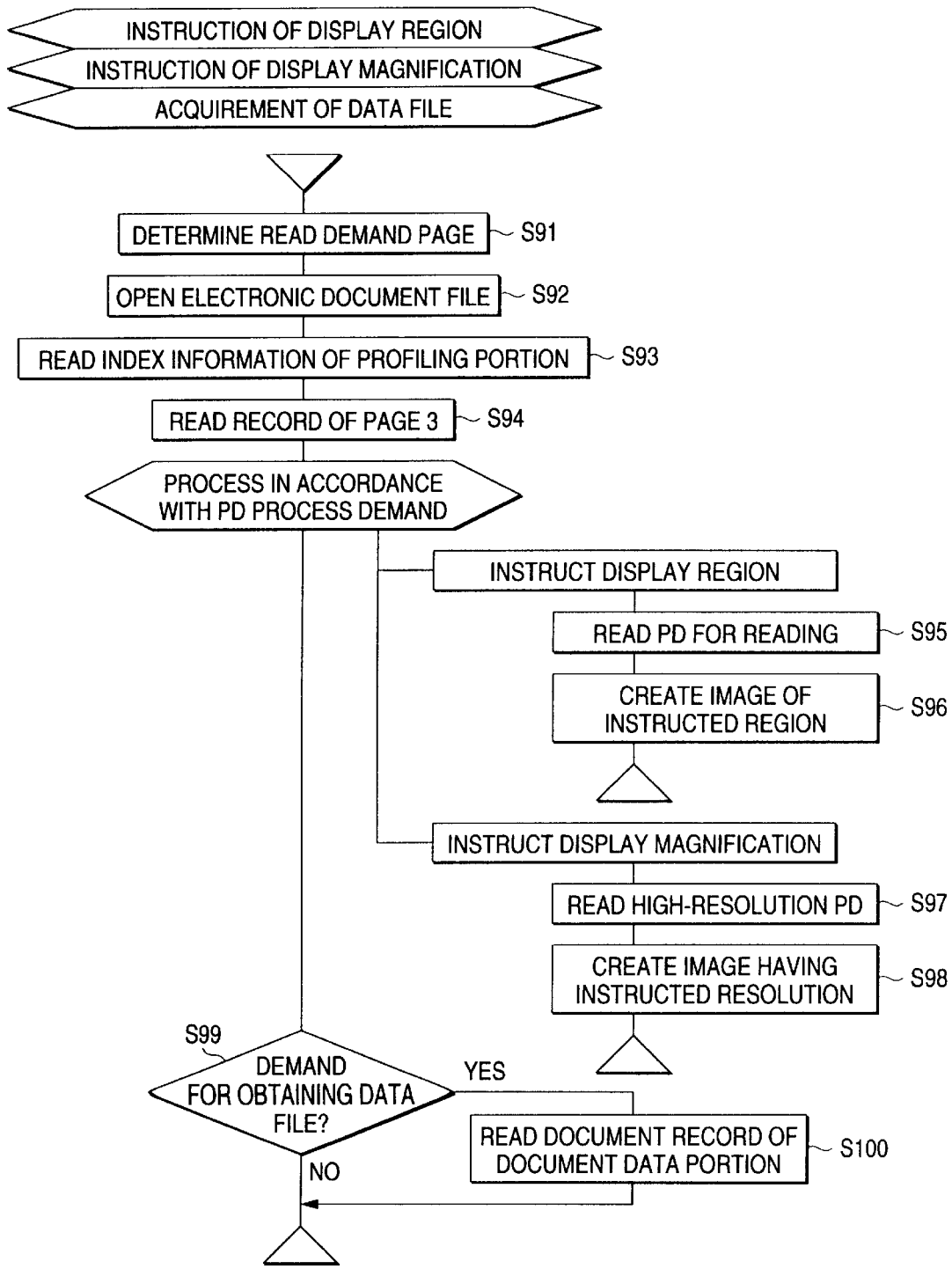
FIG. 12 is a flow chart of a display region instructing process, a display magnification instructing process and a data file acquiring process.

FIG. 12 is a flow chart of the display region instructing process, the display magnification instructing process, and the data file acquiring process.

The display region instructing process, the display magnification instructing process, and the data file acquiring process are performed such that the page demanded to be read and the contents of the process are determined in accordance with the extension portion extracted by the extension portion extracting section 22b (step S91). Then, the electronic document file, which is to be read, is opened (step S92) so that index information of the profiling portion of the electronic document file is read (step S93). In accordance with index information above, the record of the third page of the page portion of the electronic document file is read (step S94). Then, the operation is shifted to correspond to the type of the image data processing operation.

If the display region instructing process has been determined in step S91 as the contents of the required process, image data to be read is read (step S95) so that an image of the region instructed with the image data to be read is created (step S96). By making the read demand to contain the process for instructing the display region of the required image data PD, for example, "http://www.fx.co.jp/A.mp?(20,30)-(150×400)", image data can be interchanged with a further improved transmission efficiency. Thus, an advantage can be realized when the quantity of data to be transferred is attempted to be reduced. If a document is transmitted by many transferring operations in a case where the document has a large sheet size, great effects of reducing the quantity of data and shortening the required time can be obtained.

If the display magnification instructing process has been determined as the required contents of the process in step S91, image data having a high resolution is read (step S97) so that an image having the instructed resolution is created from the read image data having the high resolution (step S98). As described above, since the content instructing the display magnification of required image data PD is contained in the read demand, further detailed image data can be interchanged. The read demand may be in the form including any one of the following extension and contraction coefficients:

"http://www.fx.co.jp/A.mp?75dpi"
"http://www.fx.co.jp/A.mp?100dpi"
or
"http://www.fx.co.jp/A.mp?100%"
"http://www.fx.co.jp/A.mp?200%"

As a result, if the resolution of the image to be transferred is raised, details of a precise document can be read. If the resolution of the image to be transferred is lowered, a document having a large image size can quickly be viewed thoroughly. Thus, a document can be read in a required manner.

When a content to acquire document data as well as an image to be read is contained in the read demand, a data file created by general application software can be acquired. Therefore, it is determined whether or not a demand to acquire a data file has been made (step S99). If such a demand has been made, then a document record of the document data portion is read (step S100). As a result, if word processor data to be edited is attempted to be obtained from the read image, the word processor data can be obtained by issuing a data acquiring demand by successive operations.

Moreover, access enable conditions can be registered to the profiling portion 51 of the electronic document so that it is determined whether or not response is made for each of the addresses from which the read demands have been made and the type of the demand. As a result, a system having a structure for permitting only a client having specific address to read the document can be constructed. Similarly, a system can be constructed which permits only reading in accordance with the level image of the document access, which allows printing to be performed or which permits a data file created by general application software which is the source of the electronic document to be transmitted. Thus, the system which is capable of controlling the service contents of the document information in client units can be constructed. Moreover, a system may be constructed which is able to control the contents of the service to be provided in accordance with the conditions of the client and the user condition which has made an access.

Figure 13:
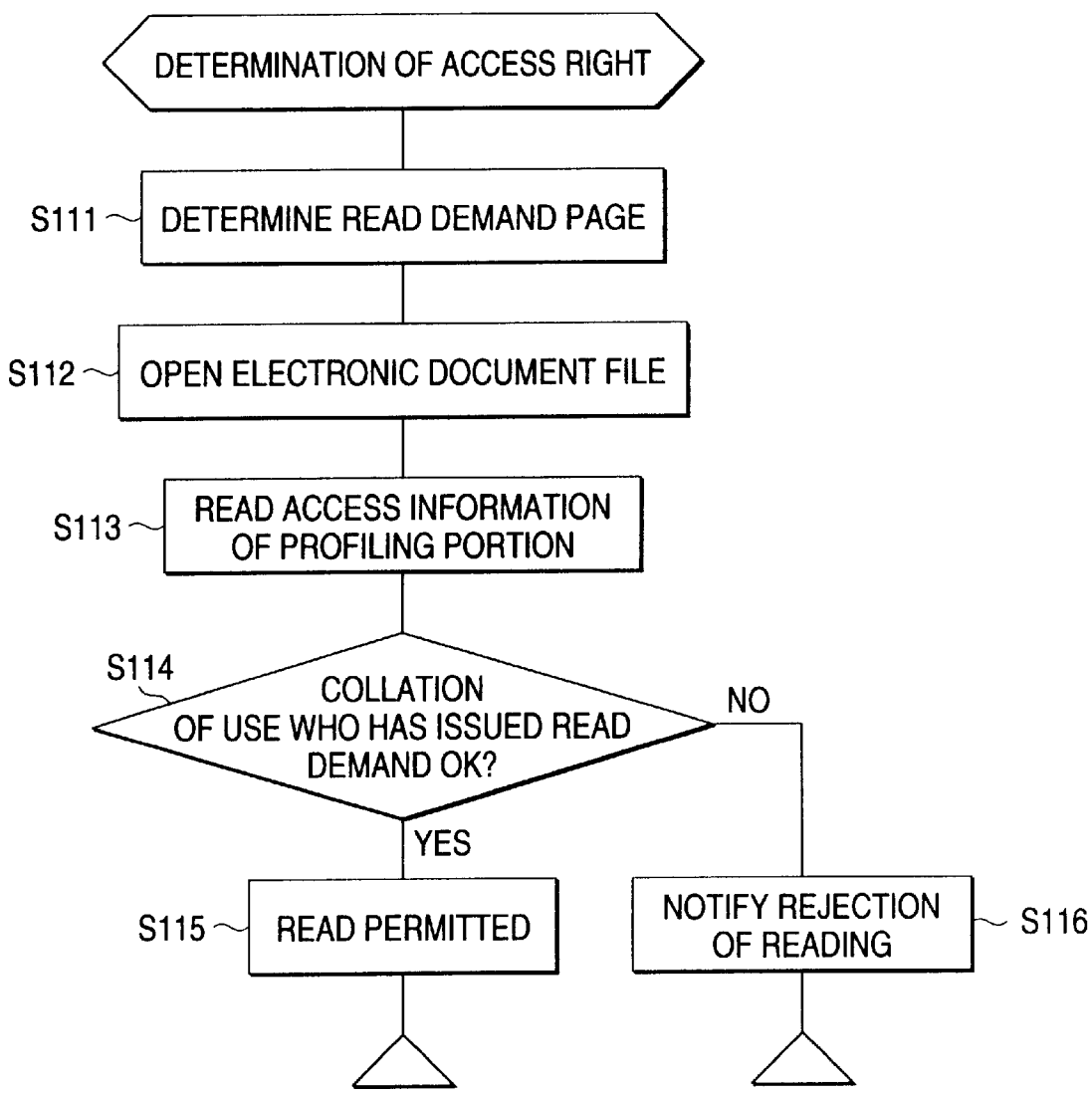
FIG. 13 is a flow chart of an access right determining process.

FIG. 13 is a flow chart showing the access right determining process.

The access right determining process is performed such that the page required to be read is determined in accordance with the extension portion extracted by the extension portion extracting section 22b (step S111). Then, the electronic document file to be read is opened (step S112), and then access information in the profiling portion of the electronic document file is read (step S113). Then, the client from which the read demand has been issued is collated (step S114). If the collation results in allowance, a determination is made that reading is permitted (step S115). If not, a response to notify the rejection of reading is performed (step S116).

As described above, use of registration of the access enable conditions permits access control to be performed such that a data file of general application software can be transferred to only clients in the subject department, printing to be permitted only clients on the same network or only image reading to be permitted to clients who have made accesses through WAN.

Figure 14:
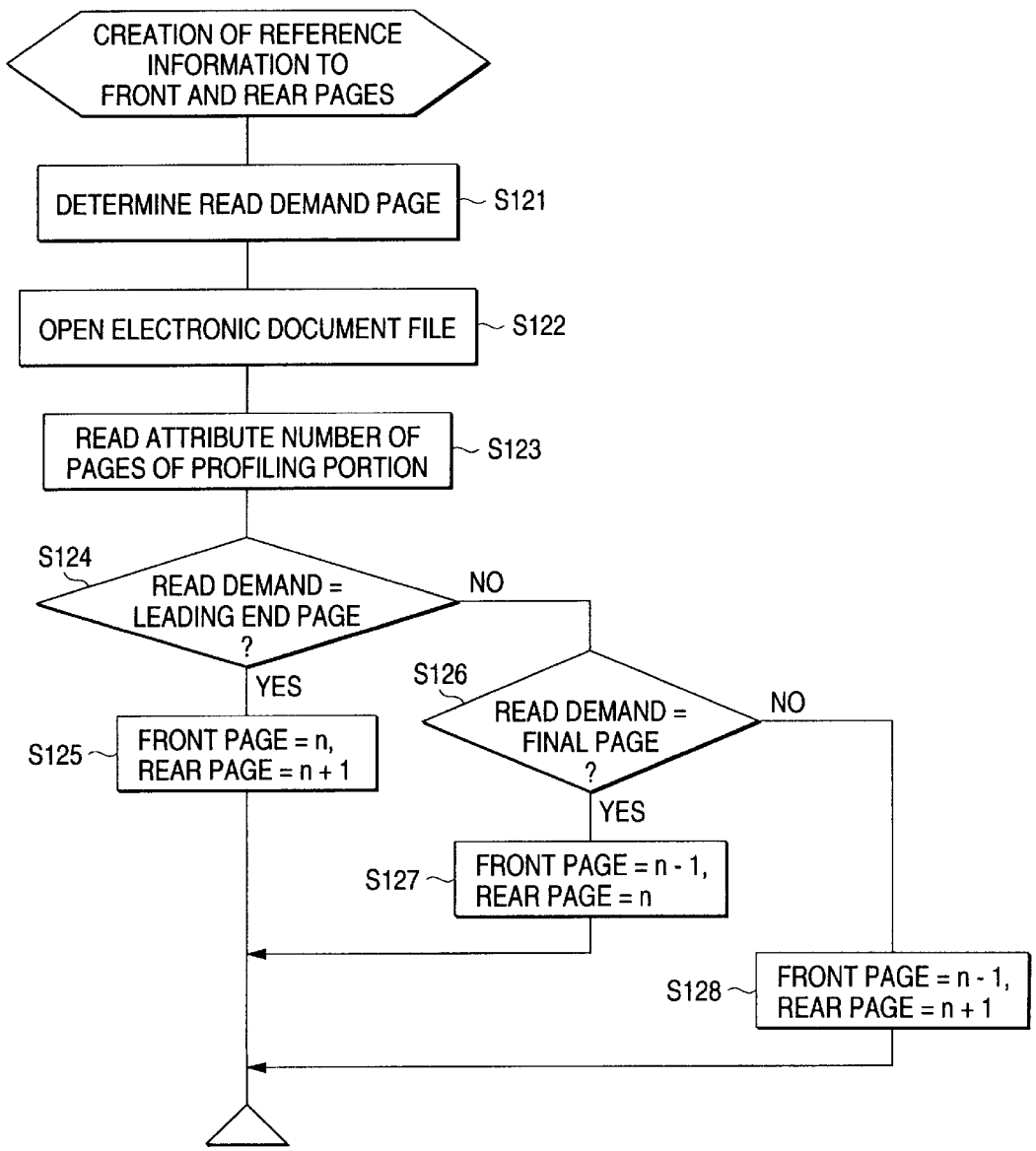
FIG. 14 is a flow chart of a process for creating reference information to a front page and a rear page.

FIG. 14 is a flow chart of the process for creating reference information to the front and rear pages. The process for creating reference information to the front and rear pages is performed by the reference information generating section 26 such that the page demanded to be read is determined in accordance with the extension portion extracted by the extension portion extracting section 22b (step S121). Then, the electronic document file required to be read is opened (step S122). The attribute of the number of pages in the profiling portion of the document is read to examine the quantity of records to detect the number of pages (step S123). Then, it is determined whether or not the page demanded to be read is the leading end page (step S124). If the page is the leading end page, the present page and the next page are determined to be the page numbers of anchors, to be embedded as reference information, because no more forward pages exist (step S125). That is, if the page number of the demanded to be read is n, then the front page is made to be n and the rear page is made to be n+1. If the page is not a page except the leading end page, it is determined whether or not the page demanded to be read is the final page (step S126). If the page is the final page, then the front page is made to be n−1 and the rear page is made to be n, because no more rear pages does not exist (step S127). If the page is an intermediate page, then the front page is made to be n−1 and the rear page is made to be n+1 (step S128).

Then, the response format synthesizing section 27 performs an operation for processing data into a data format for response. The operation is performed so that a general-purpose interchange format, which can be interpreted by the user, is created in accordance with the instruction of the image file to be read and reference information to the front and rear pages.

For example, in the document processing section 25, the instruction page image extracting process is performed in response to read demand "A.mp?p3+JPG" so that image data of a page image in the Joint Photographic Experts Group (JPEG) format is created. The front page (n=2) and the rear page (n=4) are determined in the reference information generating section 26, the front and rear pages being supplied to the response format synthesizing section 27. The response format synthesizing section 27 generates the following predetermined general-purpose interchange format in accordance with supplied information.

FIG. 15 is a diagram showing an example of a generated data format for response.

The illustrated data format for response is described with a grammar called HTML of WWW, the format being generated in the form of a text file. The foregoing text file is in the form such that a character string disposed between tags <TITLE> and </TITLE> is displayed in the portion for the title in the reading window of the display unit 14 of the client 10. The portion disposed between tags <BODY> and </BODY> is the description of the body of the text in which the page image processed and formed to correspond to the read demand, that is, the image of the third page of the instructed document file "A.MP" in the JPEG format is displayed. The two following lines correspond to the portion in which the reference information has been embedded and which is described in the following form:

<A HREF = "Portion to be Referred> Displayed Character String </A>

When the above-mentioned description is performed by the document reading apparatus, instruction of the displayed "displayed character string" causes the reference to be made to the reference content "portion to be referred". Therefore, when a character string "previous page" is displayed on the client side and the character string above is instructed by using the input unit 13, a read demand instructing the document file "A.MP" and the page number (the second page) is issued. When a character string "next page" is displayed and the character string is instructed by using the input unit 13, a read demand instructing the document file "A.MP" and the page number (the fourth page) is issued.

Although the embodiment of the read demand of a type in which the portion, in which the location of the reference information is described, is extended has been described, another arbitrary method may be employed in which the same is transferred from a client to the file server. In the case of HTML of WWW, a mechanism called "FORM" tag for notifying input from a user from the client to the file server may be employed.

The above-mentioned read demands may be combined and instructed. If the page instruction, the instruction of the type of image data, the instruction of the display region and the instruction of the display magnification are combined such that "http://www.fx.co. jp/A.mp?p3+wmf+(20,30)−(150x400)+150dpi", results of the combination can be read. As a result, the transfer efficiency and the quality of the display, such as partial region transference, which is performed when the magnification is enlarged, and instruction of the resolution for each format, can be controlled more precisely.

Moreover, the type of the image data PD returned from the file server can be limited, and the received instruction of the process corresponding to the access right can be limited to a predetermined level. For example, a method may be employed in which response to a transmission demand of a data file (for example, word processor data) of general application software from specific users is permitted and in which response of only image information for display is performed for other users. Another method may be employed in which a vector display image is transferred in a case where the character code is permitted to be used again and transmission of only a raster image in place of the code is received if the character code is not permitted to be used again. Another method may be employed in which a response to a display demand is made as usual, but print demand is rejected while permitting response to the print demand only if a printing fee is paid. Another method may be employed in which only read of the cover is permitted and the overall document can be read only if the fee is paid. As described above, a variety of applicable methods meeting the intention of the document provider may be employed. Thus, when document information to be transmitted can be varied, only information meeting the intention of the person who has created the document can be supplied. If the allowance and rejection determining level is raised, a system having an accounting structure, such as a catalogue ordering system, may be realized.

As described above, the present invention has the structure such that a document created by general application software and having a plurality of pages is stored in the document storage apparatus in such a manner that the document is stored in the form of an electronic document in which at least one set of image data is stored in page units. Moreover, when the document reading apparatus issues a read demand, the instruction of page is issued as well as the instruction of the electronic document file by previously embedding reference information into the format for the document to be read which is transmitted from the document storage apparatus. As a result, image data can be transmitted/ received in page units and therefore the response time required to complete the operation for demanding display of the page can be shortened. Since a document created by general application software can be read as general-purpose image data, the reading apparatus for using general-purpose image data image information permits a multiplicity of marketing reading apparatus to use a variety of documents as compared with the reading apparatus corresponding to various document formats. Moreover, the structure of the document reading apparatus for the user side is not required to be modified from the marketing reading mechanism (which is a WWW browser). Only by making the document storage apparatus adaptable to the foregoing method can the document reading system of this type be realized. Since the document processing section is provided, image data to be displayed and read are temporarily created whenever a read demand has been made. Therefore, the document storage apparatus is not required to previously store image data which can be dynamically created when the demand has been made. Thus, the storage efficiency can be improved.

A second embodiment of the present invention will now be described with reference to the drawings.

Figure 16:
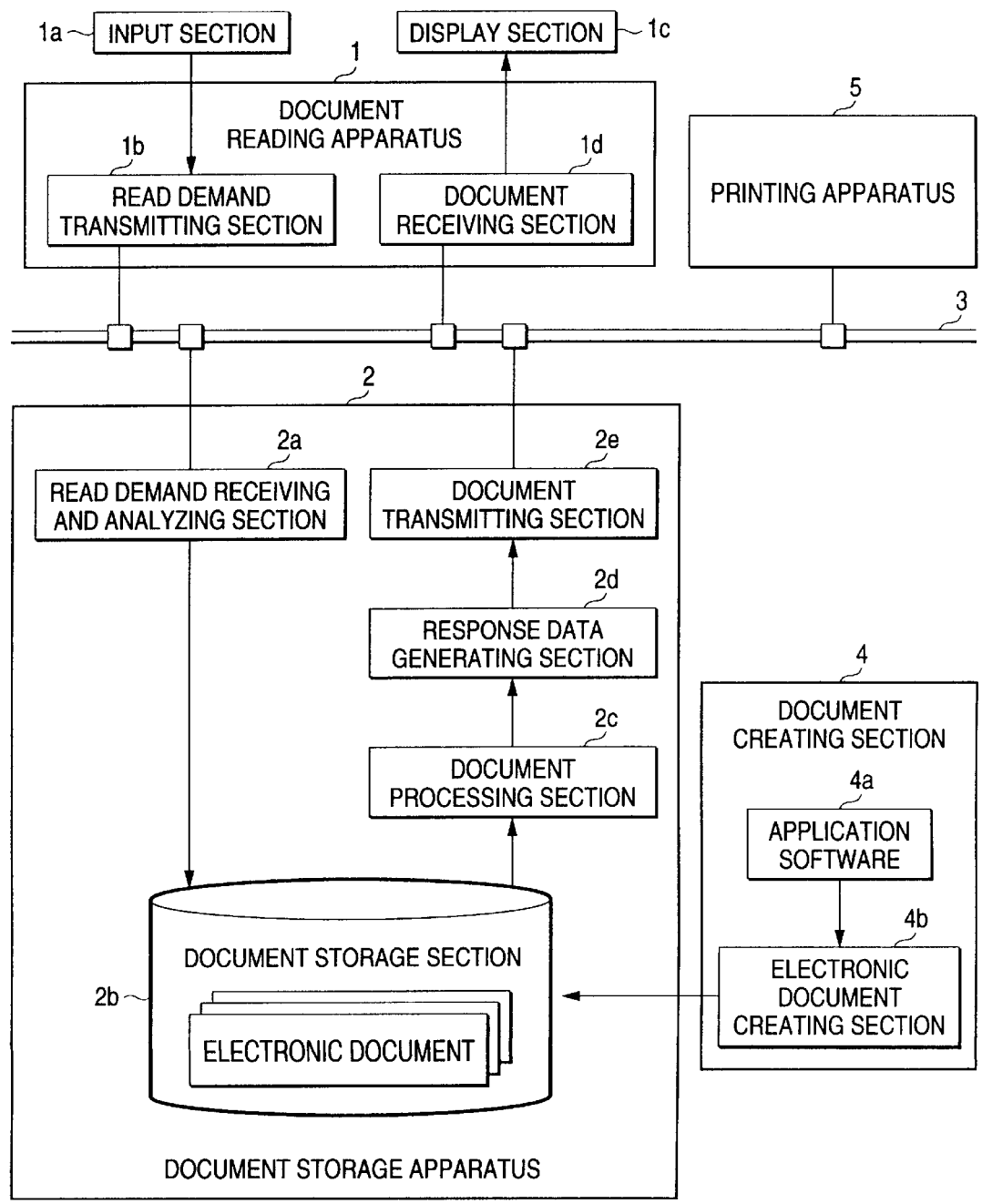
FIG. 16 is a diagram showing the principle and structure of a remote printing system in a second embodiment of the present invention.

FIG. 16 is a diagram showing the principle and structure of a remote printing system.

Referring to FIG. 16, the remote printing system has a document reading apparatus 1, a document storage apparatus 2, a printing apparatus 5 and a communication passage 3 for connecting the document reading apparatus 1, document storage apparatus 2 and the printing apparatus 5 to one another. Moreover, the remote printing system has a document creating apparatus 4 for creating an electronic document to be read.

The document reading apparatus 1 has a read demand transmitting section 1b for transmitting a read demand input and instructed through an input section 1a to the document storage apparatus 2, and a document receiving section 1d for receiving response data transmitted from the document storage apparatus 2 in response to the read demand and for outputting the response data above to a display section 1c. The document storage apparatus 2 has a read demand receiving and analyzing section 2a for receiving the read demand transmitted from the document reading apparatus 1 through the communication passage 3 to analyze the contents of the read demand, a document storage section 2b for storing electronic documents, each of which has been created by the document creating apparatus 4 and in each of which at least one group of image data is divided in page units and image data to be printed, a document processing section 2c for processing the electronic document required by the document reading apparatus 1 and stored in the document storage section 2b into image data to be read and printed to follow an issued demand, a response data generating section 2d for providing reference information for instructing an adjacent page to the document processed by the document processing section 2c to generate response data, and a document transmitting section 2e for transmitting the response data generated by the response data generating section 2d to the document reading apparatus 1 from which the read demand has been issued and transferring image data for printing processed by the document processing section 2c from the document reading apparatus 1 to the instructed printing apparatus 5. The document creating apparatus 4 includes application software 4a, such as a word processor, having a function for printing data on a paper medium, and an electronic document creating section 4b for receiving a print control command issued from the application software 4a when the printing operation is performed to process data into image data to be read in a predetermined image format in page units or image print data in page units or of the overall document to collect image data so as to form an electronic document having a predetermined document format and output the same to the document storage apparatus 2, the electronic document creating section 4b having a pseudo printing mechanism.

With the above-mentioned remote printing system, an electronic document is, in the document creating apparatus 4, created by the application software 4a. The application software 4a can be any word processor software, spreadsheet software, drawing software or database software. Strictly, the application software 4a is software having a function of printing data on a paper sheet. The document created by the application software 4a and having a plurality of pages is transferred to the electronic document creating section 4b to be processed into an electronic document stored as image data to be read in page units or image print data in page units or of the overall body of the document. The processed electronic document is transferred to the document storage apparatus 2 so that the document is stored in the document storage section 2b.

When the stored electronic document is read for printing, a read demand supplied through the input section 1a is transmitted to the communication passage 3 by the read demand transmitting section 1b of the document reading apparatus 1. The transmitted read demand is received by the read demand receiving and analyzing section 2a of the document storage apparatus 2 so that the contents of the demand are analyzed. Then, the electronic document required to be read is acquired from the document storage section 2b, and then processed by the document processing section 2d into a page format corresponding to the contents of the read demand. For example, instructed pages are extracted and converted to the instructed image format. Then, response data is generated by the response data generating section 2d. At this time, the response data generating section 2d generates response data to be read and formed such that reference information is previously embedded into the format for image data to be read in order to enable the document reading apparatus 1 to instruct the electronic document and issue an instruction of the page when the document reading apparatus 1 issues the read demand from the read demand transmitting section 1b. The response data to be read, which has been created as described above, is transmitted by the document transmitting section 2e. The response data to be read, which has been transmitted through the communication passage 3, is received by the document receiving section 1d of the document reading apparatus 1 so as to be transmitted to the display section 1c so that the response data to be read is displayed. By instructing reference information of displayed page data by the input section 1a, the instruction of the electronic document and the read demand instructing the page number linked to reference information above are issued to the document storage apparatus 2.

When the electronic document having contents which have been confirmed by the document reading apparatus 1 is printed, the document reading apparatus 1 issues a read demand including the print command. The read demand receiving and analyzing section 2a of the document storage apparatus 2 receives the read demand. Then, the document processing section 2c prepares image data to be printed, which corresponds to the contents of the read demand. When the pages to be printed have been instructed, the print image data for the instructed page is extracted from the electronic document. When the overall body of the electronic document is printed, print image data of the overall body of the document is extracted. The print image data is transmitted to the printing apparatus 5 by the document transmitting section 2e. The printing apparatus 5 receives print image data above to perform the printing operation.

Therefore, according to the present invention, response data to be read corresponding to the read demand issued from the document reading apparatus 1 is in the form of image information in page units. Therefore, a quantity of image data to be transmitted and received through the communication passage 3 at one read demand is not more than one page. Therefore, time required from the operation to demand the page display to the actual display of the instructed page on the display section 1c of the document reading apparatus 1 can be shortened. Thus, the response efficiency of the print preview can be improved in the remote printing system. Since the print command is issued to the read document and the document storage apparatus 2 prepares an image having a high quality so as to be printed and transfers the same to the instructed printing apparatus 5, satisfactory printing results can be obtained. That is, a user is able to preview quickly the page contents of the document in the document storage apparatus 2 with an image having a low resolution to confirm the contents before performing the actual printing operation with a high quality.

In general, print image data having a high quality has a considerably large quantity of information and causes a load to be borne at the time of performing the print process as compared with image data to be read. However, the actual printing process (image process and data transference) is performed without using the document reading apparatus 1 for each user but image data can be supplied directly to the printing apparatus 5 from the document storage apparatus 2. Therefore, the process requiring a great load to be borne, can be performed in a background manner by the document storage apparatus 2 and the printing apparatus 5, each of which comprises a high-performance machine.

A structure will now be described, in which the embodiment of the present invention is applied to a system permitting a plurality of users to read a document stored in the server of the network and having a plurality of pages.

Figure 17:
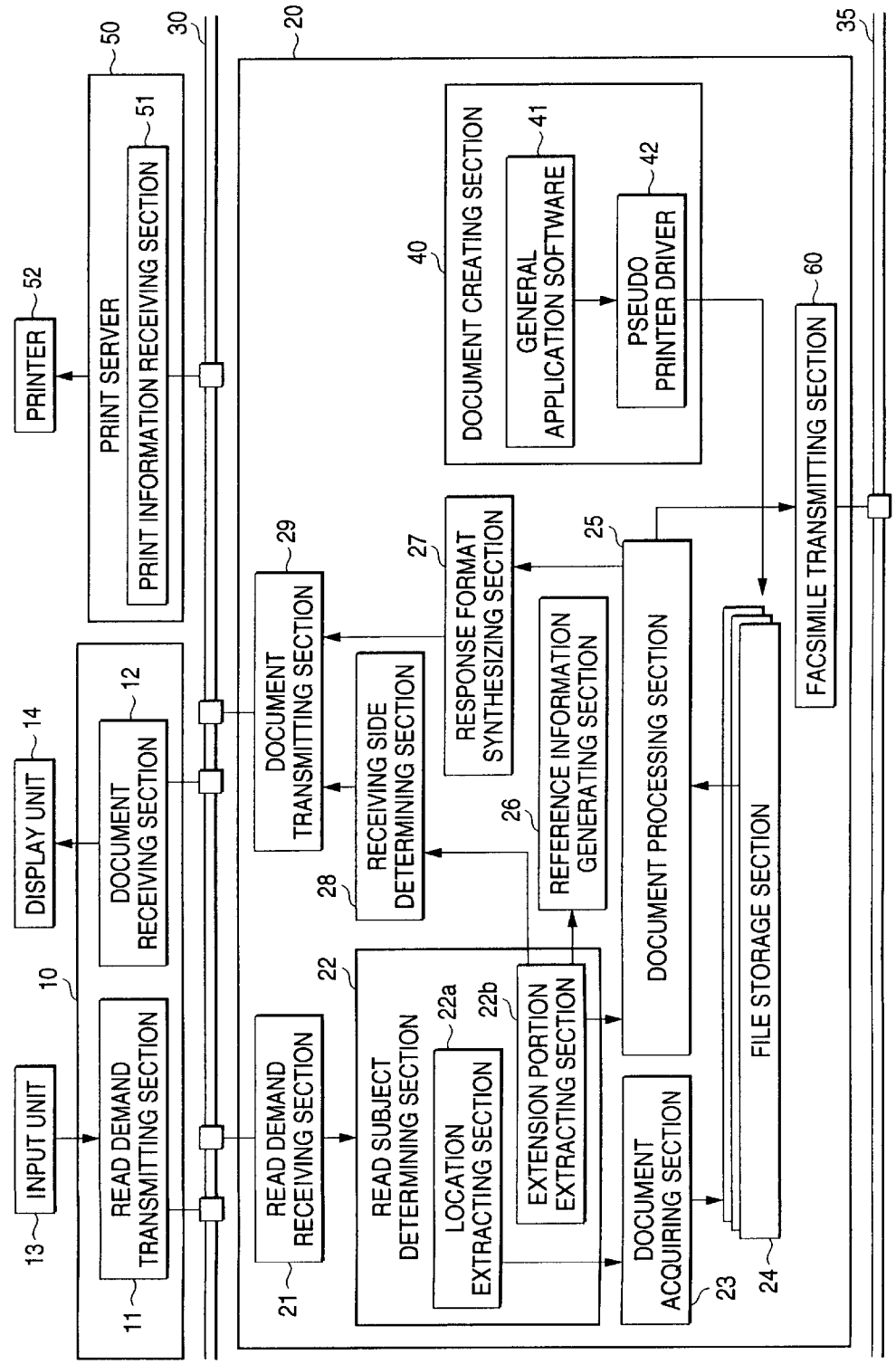
FIG. 17 is a block diagram showing an example of the structure of a server client system.

FIG. 17 is a block diagram showing an example of the structure of a server client system.

The server client system shown in FIG. 17 has a client 10, which is a terminal of a user, a file server 20, a print server 50, and a network 30 for connecting the client 10, the file server 20 and the print server 50 to one another, the network 30 being called Local Area Network (LAN) or Wide Area Network (WAN). Although the client 10 serves as a document reading apparatus and a plurality of the clients 10 exist on the network, only one client 10 is illustrated.

The client 10 has a read demand transmitting section 11 and a document receiving section 12. An input unit 13 comprising a pointing device, such as a keyboard or a mouse, is connected to the read demand transmitting section 11. A display unit 14 is connected to the document receiving section 12. The read demand transmitting section 11 and the document receiving section 12 are connected to the network 30.

The file server 20 has a read demand receiving section 21 connected to the network 30, a read subject determining section 22 for analyzing the received read demand, a document acquiring section 23 for acquiring the determined subject to be read, a file storage section 24 for storing electronic documents which have been created, a document processing section 25 for converting the acquired document into an instructed format analyzed by the read subject determining section 22, a reference information generating section 26 for generating information of adjacent pages on the basis of page information analyzed by the read subject determining section 22, a response format synthesizing section 27 for creating response data in the form in which reference information generated by the reference information generating section 26 is embedded in the document data processed by the document processing section 25, a receiving-side determining section 28 for determining the destination to which the response data is transmitted in accordance with information of the terminal from which the demand has been issued and which has been determined by the read subject determining section 22, and a document transmitting section 29 for transmitting the response data to the determined terminal. The read subject determining section 22 has a location extracting section 22a for extracting, from the read demand, information of the location of a subject file, and an extension portion extracting section 22b for extracting, from the read demand, an extension portion indicating the required contents of the process. The file server 20 also has a facsimile transmitting section 60 for receiving image data processed by the document processing section 25, the output from the facsimile transmitting section 60 being connected to a public line 35. Furthermore, the server 20 has a document creating section 40 consisting of general application software 41 and a pseudo printer driver 42. Although the structure, in which the document creating section 40 is mounted on the file server 20, has been described, the document creating section 40 may be provided for an arbitrary client on the network 30 if the environment permits the general application software 41 to be operated.

The print server 50 has a print information receiving portion 51 connected to the network 30 to receive transferred print image data. The print information receiving portion 51 is connected to output print image data to a printer 52.

Specifically, the client 10 is, for example, a personal computer or a work station having document reading software (WWW browser) which is able to make an access to the WWW server of Internet. When a user starts the software in the client 10 to transmit location identification name called Uniform Resource Locator (URL) in an instructed protocol called Hyper Text Transfer Protocol (HTTP) or File Transfer Protocol (FTP) to the file server 20, which is the WWW server, data to be returned as a response is displayed. Then, the user operates reference information to again transmit the location identification name to the file server. The above-mentioned operation is repeated so that information in a multiplicity of file servers connected to Internet is read and acquired.

The reference information is contained in a portion of display data which is received by the client 10, the reference information having information of the character range or region instruction and information required to issue a read demand (which is adjacent page information in this embodiment). When the specific display region has been instructed through the input unit 13, a read demand is issued in accordance with information above. The reference information is "anchor tag containing URL" in terms of the HTML grammar of WWW.

The read demand is a communication protocol which can be interpreted by the read demand transmitting section 11 and the read demand receiving section 21. The contents to be interchanged are called URL in the case of WWW, for example. In this case, for example, a character string is interchanged, which is, for example, "http://www.fx.co.jp/dir1/dir2/index.htm"

formed by combining the type of the protocol, instruction of name of the WWW server (the network address) and instruction of the location of the file required to be read.

The file server 20 is a document storage apparatus which is a mechanism called WWW server in Internet and serves as a resident program on an operating system, such as Unix (trade name licensed by X/Open Co. Ltd. and registered in U.S. and other countries), Windows, WindowsNT (registered trade name of Microsoft, U.S.), having a directory type file system and a network communication function. When an access demand has been supplied from the client 10, an instructed file among HTML data files stored in a predetermined directory in the file storage section 24 is returned to the client 10 from which the demand has been issued.

The facsimile transmitting section 60 is used in a case where the document, the print image of which has been confirmed by the client 10, is not transferred to the print server 50 but image data converted into a raster image MMR (modified modified read)-compressed for facsimile transmission by the document processing section 25 is transmitted to a facsimile receiver through the public line 35.

The general application software 41 in the document creating section 40 in the file server 20 is a generic name of marketing application software and exemplified by application software, such as a word processor, an editor, a spreadsheet, database or drawing software having a printing function via Graphic Device Interface (GDI) for printing data on a paper sheet.

The pseudo printer driver 42 is an output apparatus which receives print control commands issued by the general application software 41 when the printing operation is performed, collects the commands in page units to create one or more types of image data to collect image data above so as to form a page record and collect the pages so as to output the same in a specific format to be described later. That is, the pseudo printer driver 42 has a function to receive the GDI command (a drawing function) issued from the pseudo printer driver 42 in the printing process by a driver interface to convert it into Page Description Language (PDL) or generate image formation information to file information above to store it in the file storage section 24 as an electronic document in place of the process for the general printer driver to transmit the same to the printer.

The print server 50 is an apparatus having a function to receive the print command supplied through the network 30 to print data on a paper sheet. The print server 50 comprising, for example, a computer connected to the printer 52, the computer being arranged to spool a PDL file received by the print information receiving portion 51 to register as a print cue. Then, the PDL files are sequentially supplied to the printer 52 in response to the que so as to print the PDL files.

Figure 18:
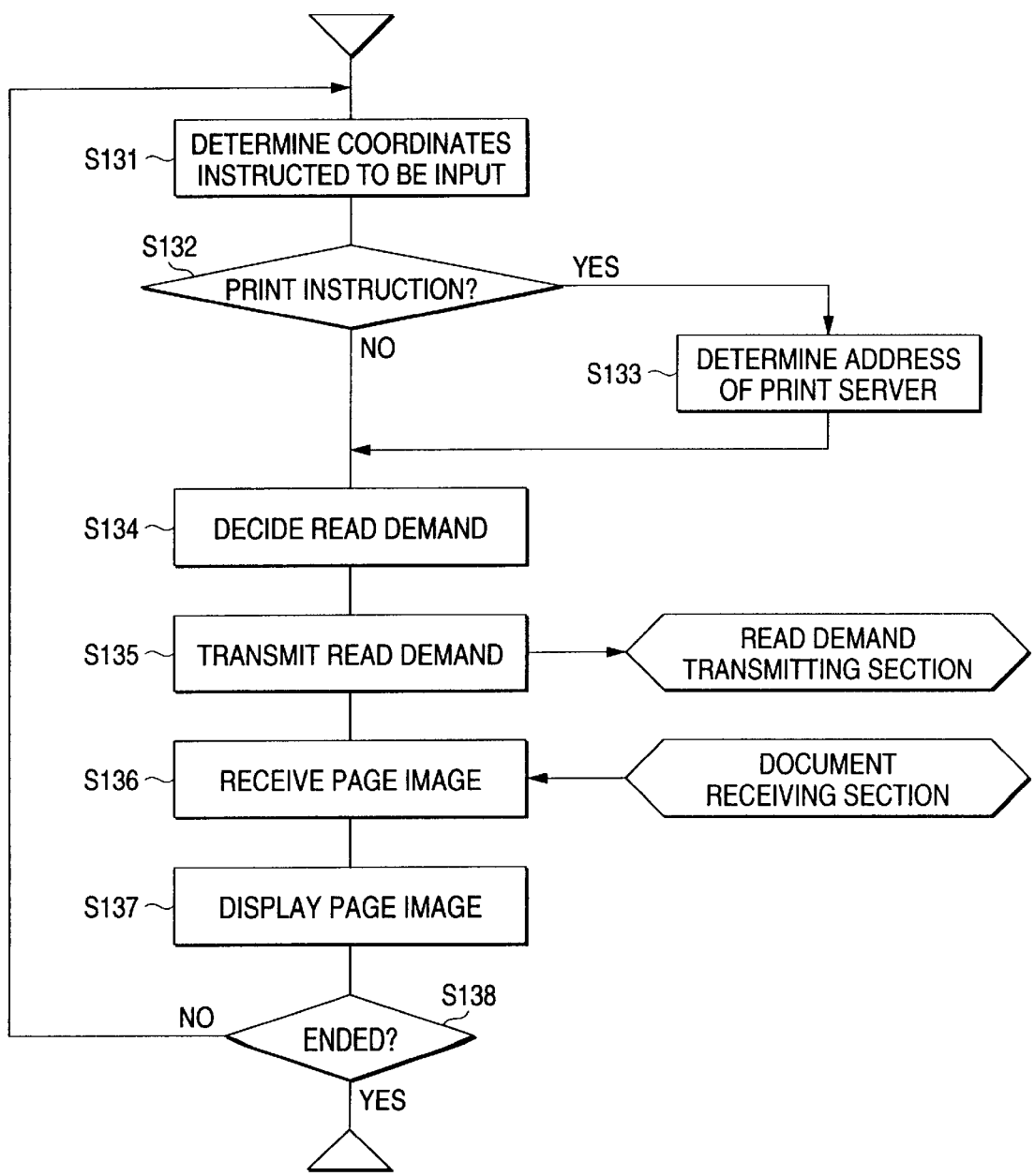
FIG. 18 is a flow chart of the operation of a document reading function of a client.

FIG. 18 is a flow chart of the operation of the document reading function of the client 10.

When a document is read by the client 10, the coordinates instructed by the input unit 13 are determined (step S131). Then, it is determined whether or not an instruction to perform remote printing is included in the input instruction (step S132). If the print instruction is included, the address of the print server is determined (step S133). This determination can be realized by using <Form> tag in the case of HTML. In accordance with the instructed coordinates and the determined address of the print server, a read demand is decided (step S134). Then, a process for transmitting the decided read demand is performed (step S135). In this process, the read demand is supplied to the read demand transmitting section 11.

When the document receiving section 12 has received a response to the read demand, the document receiving section 12 performs a page image receiving process (step 5136). The received page image is supplied to the display unit 14 so that the image is displayed on the display unit 14 (step 5137). Finally, it is determined whether or not reading of the document has been ended (step S138). If reading is not ended, the operation returns to step S131. If reading is ended, the document reading operation is ended.

Here, the read demand transmitting process in step S135 and the page image receiving process in step S136 are similar to those in the first embodiment and they are not described (see FIGS. 4 and 5).

The operation of the file server 20 will now be described.

Figure 19:
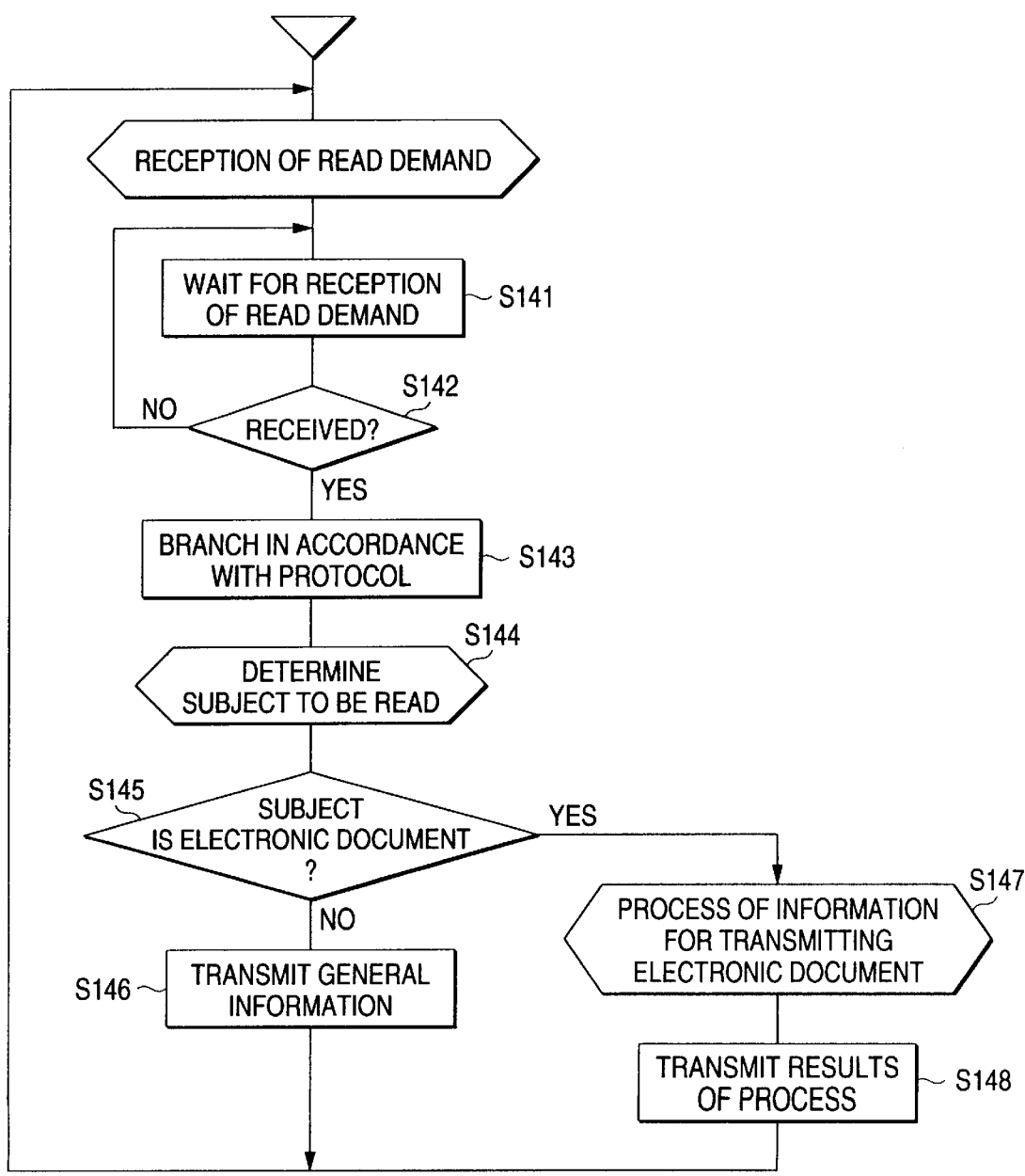
FIG. 19 is a flow chart of the operation of a file server.

FIG. 19 is a flow chart of the operation of the file server.

In the file server 20, a read demand receiving process is performed in the read demand receiving section 21. That is, the read demand receiving section 21 is brought to a state for waiting for reception of a read demand (step S141) to determine whether or not a read demand has been received (step S142). If the demand is not received, the operation returns to the state for waiting for the read demand.

If a read demand is received, the process is branched to the process corresponding to the protocol (step S143) so that a process for determining the subject to be read is performed by the read subject determining section 22 (step S144). If the determining process is ended, it is determined whether or not the file required to be read is an electronic document file in the format of the document creating section 40 (step S145). If the subject to be read is not an electronic document file by the document creating section 40, a process for transmitting general information, that is, a conventional HTML transmitting process is performed (step S146). If the subject to be read is an electronic document file of the document creating section 40, an operation for processing the transmitting information is performed (step S147) so that results of the process are transmitted (step S148). As described above, upward compatibility can be maintained with respect to a conventional and distributing format even if the subject to be read is not the electronic document file by the document creating section 40. After the transmitting process in step S146 or step S148 has been ended, the operation returns to the read demand receiving process.

Here, since the process for determining the subject to be read in step S144 is similar to that in the first embodiment and it is omitted from description (see FIG. 7).

Figure 20:
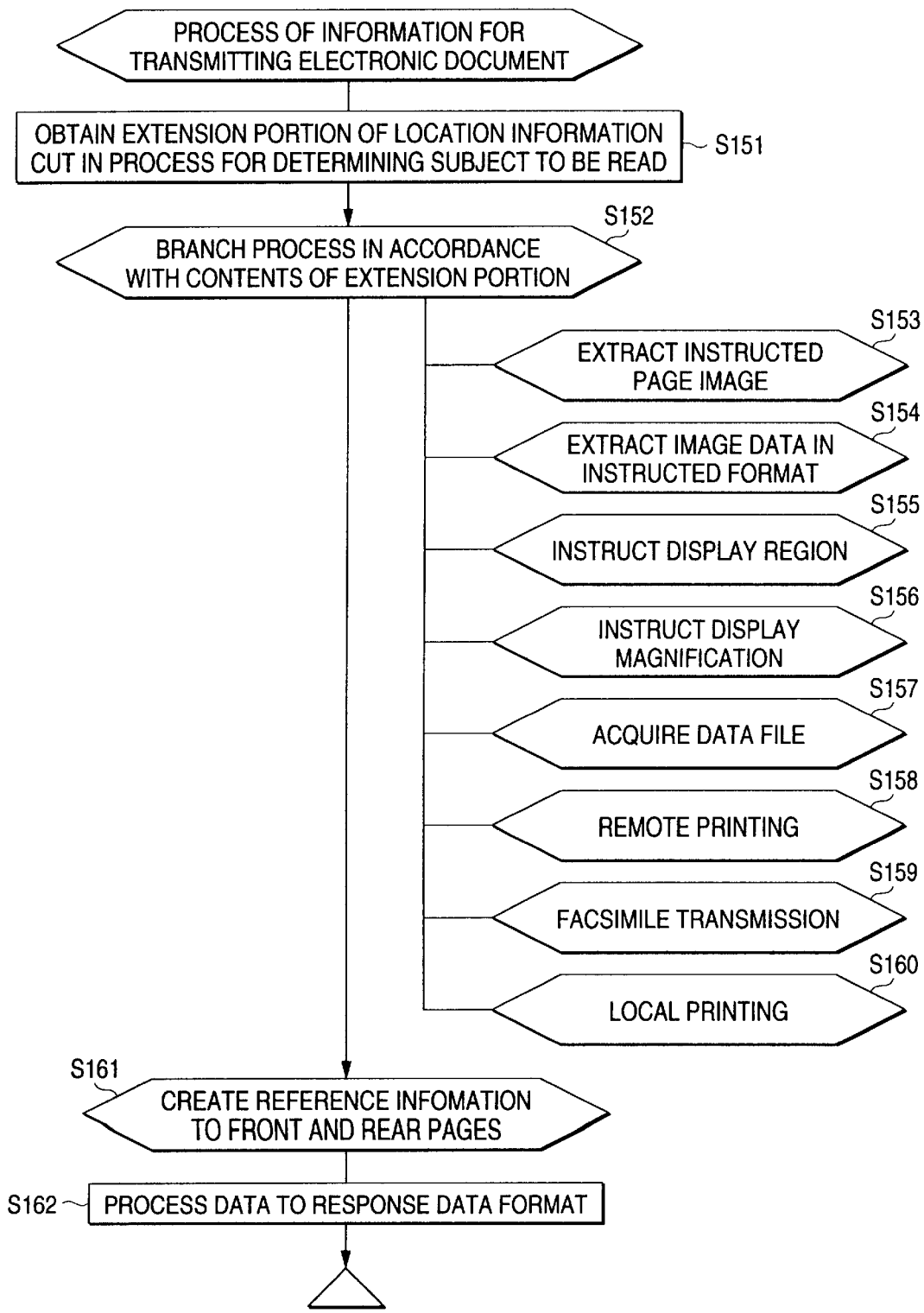
FIG. 20 is a flow chart of the operation for processing electronic document transmitting information.

FIG. 20 is a flow chart of the operation for processing information for transmitting an electronic document (step S147).

The document processing section 25 acquires, from the extension portion extracting section 22*b*, the extension portion of location information cut in the process for determining the subject to be read (step S151). That is, for example, the extension portion "p1" at the print preview or the extension portion "r-print@"print server address"" at the instruction of printing is acquired. Then, the process is branched in accordance with the contents of the extension portion (step S152). If the extension portion is "p1", the portion is an extension portion indicating the instruction of the page. Thus, the operation proceeds to the process for extracting the image of the instructed page (step S153). The other branches include a process for extracting image data in an instructed format (step S154), a display region instructing process for preparing image data in an instructed region of a specific page (step S155), a display magnification instructing process for preparing image data having an instructed resolution or an instructed magnification (step S156), a data file acquiring process for preparing native data by general application software (step S157), a remote printing process for performing transmission to the print server 50 (step S158), a process for preparing image data for facsimile communication (step S159), and a local printing process for preparing print image data which is transmitted to the printer of the client 10 (step S160). Then, a process for creating reference information to the front and rear pages is performed by the reference information generating section 26 (step S161). Finally, the response format synthesizing section 27 processes data into a data format for response (step S162).

The processes following step S153 will now be described. Before describing the processes, the electronic document created by the document creating section 40 and stored in the file storage section 24 will be described.

Figure 21:
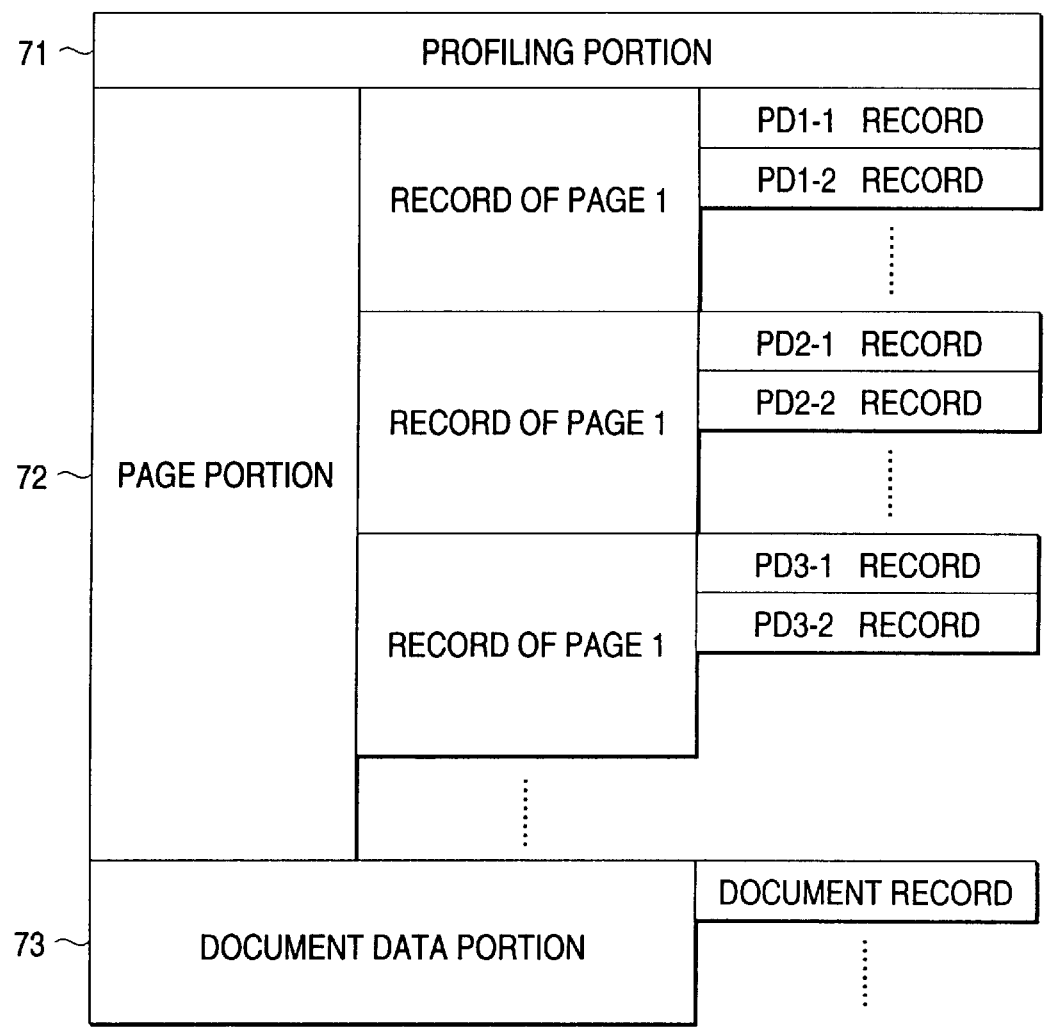
FIG. 21 is a diagram showing a data format of an electronic document which is output from a document creating apparatus.

FIG. 21 is a diagram showing the data format of an electronic document which is output from the document creating apparatus.

Referring to FIG. 21, the electronic document has a profiling portion 71, a page portion 72, and a document data portion 73. The profiling portion 71 contains attributes common to all pages, for example, index information and the number of pages. The page portion 72 is composed of records in page units. Moreover, the page portion 72 is able to store image data PD in a plurality of image formats. Note that PD1-x, PD2-x, PD3-x (where x is any one of 1, 2, 3, . . . ) indicate image data records for pages. Symbol z included in PDy-z (where y is the number of pages and z is any one of 1, 2, 3, . . . ) indicates the type of the image format. Specifically, the raster image includes paint type software images, G3 facsimile interchange images which are so-called Modified Modified Read (MMR) compressed images and scan images formed by an image scanner or a digital copying machine. As the paint type software image, the bit map format which is a standard format in HTML and a multiplicity of formats, which can be operated in the Windows environment can be available. Vector images (a set of a character code, a graphic element, an image and drawing attribute) include Windows Meta File (WMF) and Enhanced WMF (EWMF) each of which is a standard graphic image interchange format in the Windows environment, PICT which is a standard graphic interchange format for use in Macintosh (trade name of Apple Computer Inc., U.S.), Computer Graphic Metafile (CGM) which is ISO standard for interchanging graphic images, PDF which is a format for viewer "Acrobat" proposed by Adobe Systems, U.S., and Encapsulated PostScript Format (EPSF). Moreover, description languages for printers include PostScript (trade name of Adobe Systems, U.S.) which is a PDL. The page portion 72 stores image data to be read and print image data in page units in the format selected from the above-mentioned standard formats. The document data portion 73 stores print image data including print commands for all pages and the data file in the format instructed by the application software which has created the foregoing electronic document as document records.

Here, among processes following step S153, the processes from step S153 to step S157 are similar to those in the first embodiment and they are not described (see FIGS. 10, 11 and 12).

Figure 22:
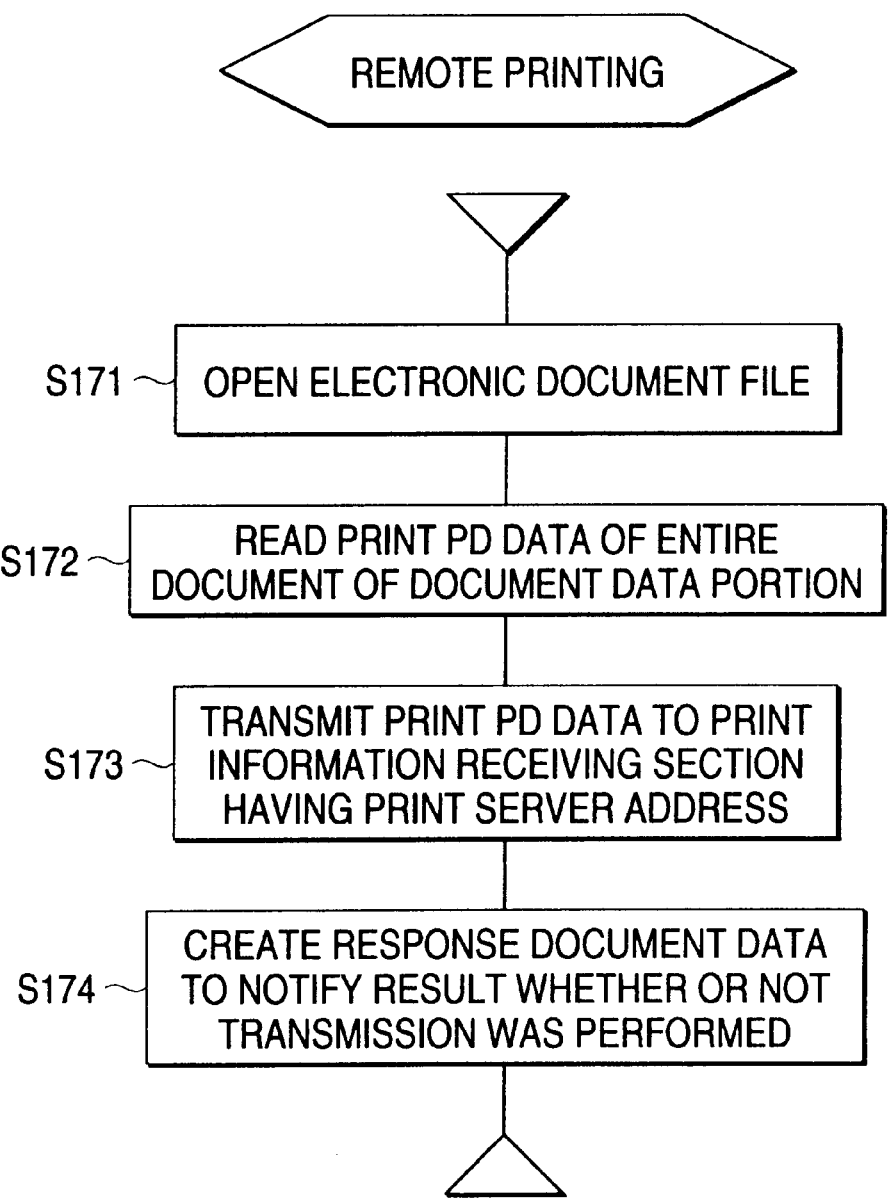
FIG. 22 is a flow chart of a remote printing process.

FIG. 22 is a flow chart of a remote printing process (step S158).

When the read demand contains a remote print command, for example, when "r-print" has been instructed together with the address of the print server, the electronic document file, which is the subject to be read, is opened (step S171) so as to read print image data PD of the overall body of the document of the document data portion (step S172). In general, since print of all pages is usually required, image data of the overall body of the document (for example, PDL data on the basis of PostScript) stored in the document data portion is read. If a specific page or pages are required to be printed, print image data of the required page or pages stored in the page portion of the electronic document is read from the same. If necessary, the read demand may include an instruction of print quality, such as an instruction of color printing, resolution and format. Therefore, image data of the overall body of the read document or the instructed page or pages is processed to meet the requirement. Then, print image data PD is transmitted to the print information receiving portion of the print server having the address instructed in the read demand (step S173). Then, response document data for notifying the client whether or not the transmission was performed is created (step S174).

Figure 23:
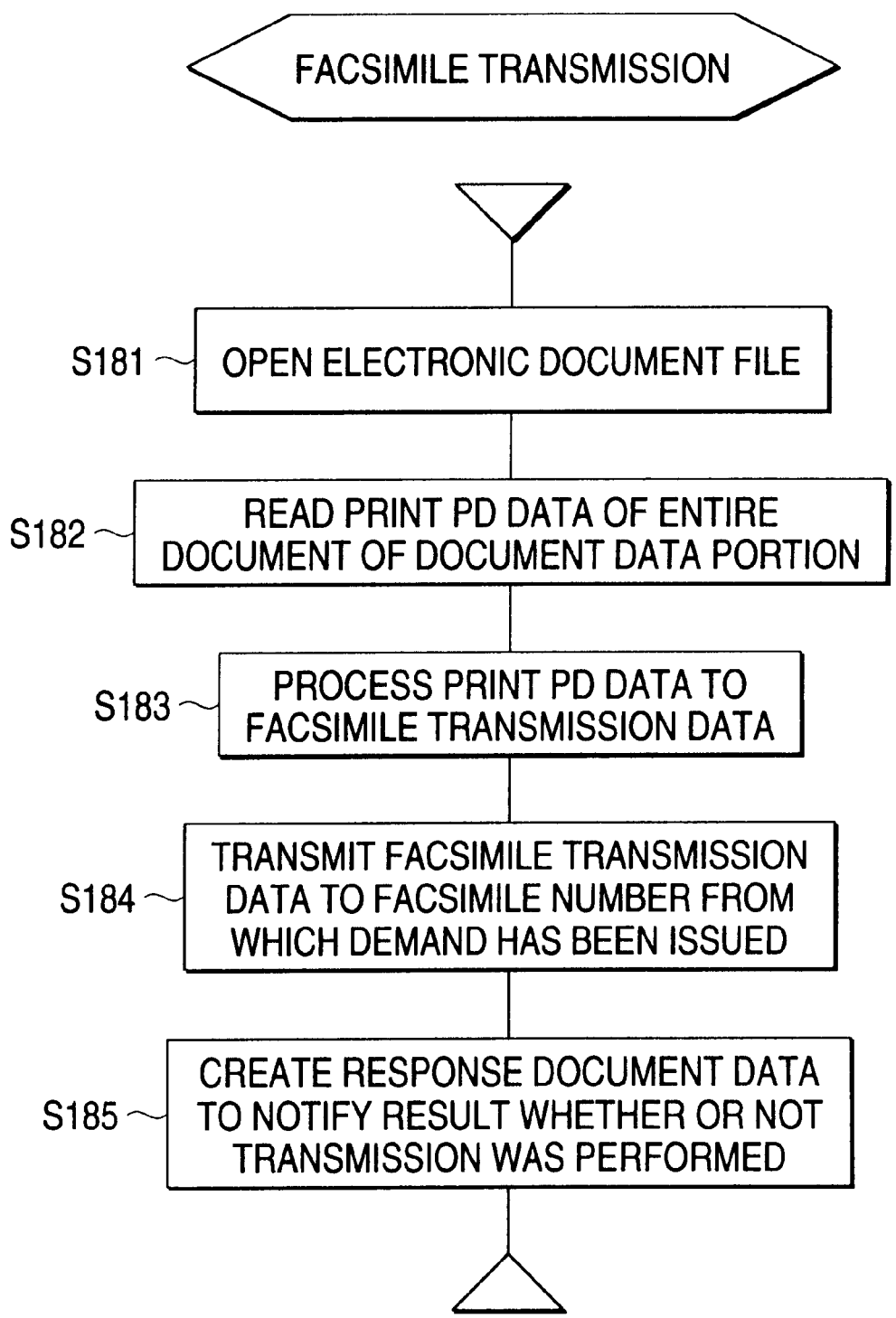
FIG. 23 is a flow chart of a facsimile transmitting process.

FIG. 23 is a flow chart showing the facsimile transmitting process (step S159).

If a facsimile transmitting demand is included in the read demand, that is, if a facsimile transmitting instruction as "http://www.fx.co.jp/A.mp?send-FAX@03-zzzz-zzzz" is included in the read demand, the electronic document, which is the subject to be read, is opened (step S181) to read print image data PD of the overall body of the document in the document data portion is read (step S182). Then, the read print image data PD is processed into facsimile transmission data (step S183). If the print image data is PDL data on the basis of PostScript, the print image data is converted from PostScript to MMR compression data. Then, the facsimile transmitting section 60 transmits the facsimile transmission data to the facsimile receiving apparatus having the facsimile number instructed in the read demand (step S184). Finally, response document data to notify the client whether or not the transmission was performed is created (step S185).

When local printing is performed (step S160), for example, "?Lprint" is instructed following the name of the electronic file which is the subject to be read. The local printing process is performed similarly to the remote printing process except the destination of the transmission being the client. Therefore, the local printing process is omitted from description.

The process for creating reference information to the front page and the rear page (step S161) is similar to that in the first embodiment and it is not described (see FIGS. 14 and 15).

When the above-mentioned environment is realized, any modification of a marketing mechanism (which is WWW browser), which has been used widely, is not required. Only the file server side is required to be modified to realize a satisfactory print preview and document printing environment. Since a read demand for printing (facsimile transmission) can be defined as the facsimile image through the facsimile line, the facsimile apparatus can be used as an alternate printer if an excessively heavy load is expected to be borne by the LAN line or no printer exists near the user. The foregoing technique can be applied to "FAX BOX System" using Internet. That is, a service can be realized in which the contents of the document can be confirmed on the screen to require facsimile transmission if the document data is a required document.

As described above, the present invention has the structure in which the document storage apparatus stores a document created by general application software and having a plurality of pages such that an electronic document is stored which has a set of image data to be read and divided into page units and print image data. As a result, when the electronic document is read for the print preview, the transmission and reception of image data to be read is in the form in page units. Therefore, the response to the operation requiring display of the page print preview can be performed quickly. If a remote printing instruction is issued, the document storage apparatus acquires print image data from the document to be read to transfer the same to a printing apparatus having another address on the network. Therefore, high quality printing can be performed. That is, both high speed reading on the electronic screen and high quality printing can be performed.

In general, image data to be printed with high quality has a considerably large quantity of information and requires an excessively heavy load in the printing process as compared with image data to be read and having a low resolution. However, print image data is not allowed to pass through the document reading apparatus, but it is directly transferred from the document storage apparatus to the printing apparatus. Therefore, no load is applied on the document reading apparatus.

Moreover, the document processing section is able to treat a specific page or an instructed page range of the document to be read as print information which must be transferred to the printing apparatus. Therefore, the print quality, including whether or not color printing is performed, the resolution and format, can be instructed. Therefore, printing can be set precisely to meet a purpose of a user. Since the document storage apparatus has a facsimile transmitting section, the facsimile apparatus can be used as the printing apparatus.

What is claimed is:

1. A document storage apparatus for forming a document reading system such that said document storage apparatus is combined with a document reading apparatus comprising read demand transmitting means for transmitting a read demand and document receiving means for receiving a document transmitted in response to the read demand to display the received document and to create a read demand in accordance with reference information of the displayed document in a case where the reference information has been instructed, said document storage apparatus comprising:

read demand receiving and analyzing means for receiving the read demand issued from said document reading apparatus to analyze required contents;

document storage means for storing an electronic document held in page units;

document extracting means for extracting a subject page of the electronic document to meet the read demand;

response data generating means for generating reference information to a front page and a rear page to meet the read demand to synthesize the reference information to the page of the electronic document extracted by said document extracting means so as to generate response data;

instruction means for referring to a preceding or next page of the extracted electronic document:

display means for displaying said reference information together with an image of the extracted page of the electronic document and for displaying instruction means; and document transmitting means for transmitting the generated response data to said document reading apparatus from which the read demand has been issued.

2. The document storage apparatus according to claim 1, wherein said document extracting means processes the extracted page of the electronic document to meet the read demand.

3. The document storage apparatus according to claim 1, wherein said document storage means stores an electronic document created by a document creating apparatus comprising electronic document creating means which receives a print control command issued by application software when a printing process is performed, processes the print control command into image data in page units in accordance with a predetermined image format, and collects image data in page units to output the image data in page units in accordance with a predetermined document format.

4. The document storage apparatus according to claim 1, wherein said read demand receiving and analyzing means comprises read demand receiving means for receiving a read demand issued by said document reading apparatus, read subject determining means for extracting, from the received read demand, location information of a subject to be read, and process instruction information instructed when reading has been required, and document acquiring means for acquiring, from said document storage means, an electronic document which is the subject to be read, based on the location information.

5. A document storage apparatus for forming a remote printing system such that said document storage apparatus is combined with a printing apparatus for printing data and a document reading apparatus comprising read demand transmitting means for transmitting a read demand including display of a print image and instruction of a printing condition and document receiving means for receiving read response data and to create a read demand in accordance with reference information of the displayed read response data in a case where the reference information has been instructed so as to transmit the read demand, said document storage apparatus comprising:

read demand receiving and analyzing means for receiving the read demand issued from said document reading apparatus to analyze required contents;

document storage means for storing an electronic document including read data held in page units and print data held in page units;

document extracting means for extracting a subject page of the read data and print data to meet the read demand;

read response data generating means for generating reference information to a front page and a rear page to meet the read demand to synthesize the reference information to the page of the read data extracted by said document extracting means so as to generate read response data;

instruction means for referring to a preceding or next page of the extracted electronic document;

display means for displaying said reference information together with an image of the extracted page of the electronic document and for displaying instruction means; and document transmitting means for transmitting the generated read response data to said document reading apparatus from which the read demand has been issued and for transmitting the print data to said printing apparatus.

6. The document storage apparatus according to claim 5, wherein said document extracting means processes the overall body of the extracted page of the read data and the print data or the extracted page in accordance with the read demand.

7. The document storage apparatus according to claim 5, wherein said document storage means stores an electronic document created by an electronic document creating apparatus comprising electronic document creating means which receives a print command issued from application software when a printing process is performed, processes the print command into read data in page units and overall page of print data or in page units in accordance with a predetermined image format, and collects overall page of the read data and print data or in page units to output them in accordance with a predetermined document format.

8. The document storage apparatus according to claim 5, further comprising facsimile transmitting means for transmitting print data extracted from the electronic document by said document processing means and processed into facsimile transmission data to a receiving side instructed with the read demand.

* * * * *